US012565568B2

(12) United States Patent
Mueller et al.

(10) Patent No.: US 12,565,568 B2
(45) **Date of Patent: *Mar. 3, 2026**

(54) AQUEOUS BINDER COMPOSITIONS

(71) Applicant: Owens Corning Intellectual Capital, LLC, Toledo, OH (US)

(72) Inventors: Gert Mueller, New Albany, OH (US); Xiujuan Zhang, New Albany, OH (US); Liang Chen, New Albany, OH (US); Jose Mendez-Andino, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1009 days.

This patent is subject to a terminal disclaimer.

(21) Appl. No.: 17/602,005

(22) PCT Filed: Apr. 7, 2020

(86) PCT No.: PCT/US2020/026994
§ 371 (c)(1),
(2) Date: Oct. 7, 2021

(87) PCT Pub. No.: WO2020/210188
PCT Pub. Date: Oct. 15, 2020

(65) Prior Publication Data
US 2022/0162410 A1 May 26, 2022

Related U.S. Application Data

(60) Provisional application No. 62/831,222, filed on Apr. 9, 2019.

(51) Int. Cl.
| | |
|---|---|
| *C09D 5/00* | (2006.01) |
| *B32B 27/04* | (2006.01) |
| *B32B 27/28* | (2006.01) |
| *C08F 16/06* | (2006.01) |
| *C08J 5/24* | (2006.01) |
| *C08K 5/053* | (2006.01) |
| *C08K 5/17* | (2006.01) |

(52) U.S. Cl.
CPC .............. *C08J 5/249* (2021.05); *C08F 16/06* (2013.01); *C08J 5/244* (2021.05); *C08K 5/053* (2013.01); *C08K 5/17* (2013.01); *C08F 2810/20* (2013.01); *C08J 2329/04* (2013.01)

(58) Field of Classification Search
None
See application file for complete search history.

(56) References Cited

U.S. PATENT DOCUMENTS

| | | |
|---|---|---|
| 3,920,868 A | 11/1975 | Hammer |
| 4,613,627 A | 9/1986 | Sherman et al. |
| 4,777,763 A | 10/1988 | Shannon et al. |
| 4,794,728 A | 1/1989 | Tsukada et al. |
| 5,244,695 A | 9/1993 | Davidowich et al. |
| 5,300,192 A | 4/1994 | Hansen et al. |
| 5,318,990 A | 6/1994 | Strauss |
| 5,342,680 A | 8/1994 | Randall |
| 5,349,041 A | 9/1994 | Blum et al. |
| 5,600,919 A | 2/1997 | Kummermehr et al. |
| 5,644,880 A | 7/1997 | Lehnert et al. |
| 5,660,900 A | 8/1997 | Andersen et al. |
| 5,661,213 A | 8/1997 | Arkens et al. |
| 5,679,145 A | 10/1997 | Andersen et al. |
| 5,763,524 A * | 6/1998 | Arkens .................. D04H 1/587 525/340 |
| 5,810,961 A | 9/1998 | Andersen et al. |
| 5,948,833 A | 9/1999 | Jilek et al. |
| 6,030,673 A | 2/2000 | Andersen et al. |
| 6,068,907 A | 5/2000 | Beauregard |
| 6,071,994 A | 6/2000 | Hummerich et al. |
| 6,079,153 A | 6/2000 | Templeton |
| 6,099,773 A | 8/2000 | Reck et al. |
| 6,123,172 A | 9/2000 | Byrd et al. |
| 6,146,746 A | 11/2000 | Reck et al. |
| 6,150,002 A | 11/2000 | Varona |
| 6,221,973 B1 | 4/2001 | Arkens et al. |
| 6,299,936 B1 | 10/2001 | Reck et al. |
| 6,305,495 B1 | 10/2001 | Keegan |
| 6,331,350 B1 | 12/2001 | Taylor et al. |
| 6,443,256 B1 | 9/2002 | Baig |

(Continued)

FOREIGN PATENT DOCUMENTS

| | | |
|---|---|---|
| CA | 1228557 A1 | 10/1987 |
| CA | 2301248 A1 | 9/2000 |

(Continued)

OTHER PUBLICATIONS

Office Action from CN Application No. 202080036638.4 dated Jul. 6, 2024.
Office Action from CN Application No. 202080036638.4 dated Mar. 11, 2023.
Wikipedia, "Triose," retrieved from <https://en.wikipedia.org/wiki/Triose> on Oct. 29, 2021.
Extended European Search Report from EP Application No. 20786936.3 dated Nov. 22, 2022.
Office Action from JP Application No. 2021-559770 dated Mar. 7, 2024.

(Continued)

*Primary Examiner* — Michael J Feely
(74) *Attorney, Agent, or Firm* — Calfee, Halter & Griswold LLP

(57) ABSTRACT

An aqueous binder composition is disclosed that comprises at least one long-chain polyol having at least two hydroxyl groups and a number average molecular weight of at least 2,000 Daltons; a primary cross-linking agent comprising at least two carboxylic acid groups; and a secondary cross-linking agent comprising a short-chain polyol having at least two hydroxyl groups and a number average molecular weight less than 2,000 Daltons.

25 Claims, 17 Drawing Sheets

(56)  References Cited

U.S. PATENT DOCUMENTS

| | | | |
|---|---|---|---|
| 6,511,561 | B1 | 1/2003 | Kohlhammer et al. |
| 6,699,945 | B1 | 3/2004 | Chen et al. |
| 6,734,237 | B1 | 5/2004 | Taylor et al. |
| 6,759,116 | B2 | 7/2004 | Edlund |
| 6,774,071 | B2 | 8/2004 | Horner et al. |
| 6,780,356 | B1 | 8/2004 | Putt et al. |
| 6,803,439 | B2 | 10/2004 | Taylor |
| 6,818,694 | B2 | 11/2004 | Hindi et al. |
| 6,838,163 | B2 | 1/2005 | Smith et al. |
| 6,849,683 | B2 | 2/2005 | Husemoen et al. |
| 6,884,838 | B2 | 4/2005 | Taylor et al. |
| 6,933,349 | B2 | 8/2005 | Chen et al. |
| 6,939,818 | B2 | 9/2005 | Drax et al. |
| 6,951,602 | B1 | 10/2005 | Reuter et al. |
| 7,026,390 | B2 | 4/2006 | O'Brien-Bernini et al. |
| 7,067,579 | B2 | 6/2006 | Taylor et al. |
| 7,141,284 | B2 | 11/2006 | Newton et al. |
| 7,157,524 | B2 | 1/2007 | Chen et al. |
| 7,199,179 | B2 | 4/2007 | Clamen et al. |
| 7,300,892 | B2 | 11/2007 | Porter |
| 7,338,702 | B2 | 3/2008 | Swales et al. |
| 7,351,673 | B1 | 4/2008 | Groh et al. |
| 7,377,084 | B2 | 5/2008 | Swiszcz et al. |
| 7,459,490 | B2 | 12/2008 | Husemoen et al. |
| 7,547,375 | B2 | 6/2009 | Jaffee et al. |
| 7,641,764 | B2 | 1/2010 | Yoshida et al. |
| 7,803,727 | B2 | 9/2010 | Aseere et al. |
| 7,807,592 | B2 | 10/2010 | Bland et al. |
| 7,824,762 | B2 | 11/2010 | Ziegler |
| 7,829,488 | B2 | 11/2010 | Bennett |
| 7,833,638 | B2 | 11/2010 | Zheng et al. |
| 7,842,382 | B2 | 11/2010 | Helbing |
| 7,893,154 | B2 | 2/2011 | Van Herwijnen et al. |
| 7,989,370 | B2 | 8/2011 | Currier et al. |
| 8,007,886 | B2 | 8/2011 | Tierney et al. |
| 8,017,531 | B2 | 9/2011 | Ahluwalia et al. |
| 8,044,168 | B2 | 10/2011 | Gudik-Sorensen |
| 8,069,629 | B2 | 12/2011 | Rockwell et al. |
| 8,084,379 | B2 | 12/2011 | Hogan et al. |
| 8,127,509 | B2 | 3/2012 | Propst |
| 8,133,952 | B2 | 3/2012 | Pisanova et al. |
| 8,209,904 | B2 | 7/2012 | Bouwens et al. |
| 8,211,974 | B2 | 7/2012 | Shooshtari et al. |
| 8,283,266 | B2 | 10/2012 | Jaffee et al. |
| 8,299,153 | B2 | 10/2012 | Kelly |
| 8,329,798 | B2 | 12/2012 | Clamen et al. |
| 8,329,817 | B2 | 12/2012 | Espiard et al. |
| 8,357,746 | B2 | 1/2013 | Shooshtari |
| 8,486,516 | B2 | 7/2013 | Hauber et al. |
| 8,552,140 | B2 | 10/2013 | Swift |
| 8,603,631 | B2 | 12/2013 | Helbing |
| 8,604,122 | B2 | 12/2013 | Kelly |
| 8,607,929 | B2 | 12/2013 | Bliton et al. |
| 8,623,234 | B2 | 1/2014 | Jaffrennou et al. |
| 8,650,913 | B2 | 2/2014 | Chacko et al. |
| 8,652,579 | B2 | 2/2014 | Shooshtari et al. |
| 8,791,198 | B2 | 7/2014 | Miller et al. |
| 8,808,443 | B2 | 8/2014 | Jaffrennou |
| 8,815,382 | B2 | 8/2014 | Robinson, Jr. |
| 8,864,893 | B2 | 10/2014 | Hawkins et al. |
| 8,865,816 | B2 | 10/2014 | Zhang |
| 8,974,686 | B2 | 3/2015 | Jaffrennou et al. |
| 8,980,774 | B2 | 3/2015 | Zhang et al. |
| 9,039,827 | B2 | 5/2015 | Hampson |
| 9,172,074 | B2 | 10/2015 | Weber et al. |
| 9,174,868 | B2 | 11/2015 | Jaffrennou et al. |
| 9,217,065 | B2 | 12/2015 | Shoemake et al. |
| 9,238,749 | B2 | 1/2016 | Michl et al. |
| 9,290,640 | B2 | 3/2016 | Hawkins et al. |
| 9,309,436 | B2 | 4/2016 | Swift |
| 9,359,720 | B2 | 6/2016 | Chuda et al. |
| 9,376,810 | B2 | 6/2016 | Kemp et al. |
| 9,382,404 | B2 | 7/2016 | Zhang |
| 9,404,012 | B2 | 8/2016 | Connaughton, I et al. |
| 9,453,140 | B2 | 9/2016 | Varagnat et al. |
| 9,486,980 | B2 | 11/2016 | Hauber et al. |
| PP27,475 | P2 | 12/2016 | Kubby |
| 9,550,894 | B2 | 1/2017 | Zhang et al. |
| 9,609,813 | B2 | 4/2017 | Naerum et al. |
| 9,683,143 | B2 | 6/2017 | Negri et al. |
| 9,715,872 | B2 | 7/2017 | Guzman et al. |
| 9,777,472 | B2 | 10/2017 | Wiker et al. |
| 9,815,928 | B2 | 11/2017 | Williamson et al. |
| 9,822,042 | B2 | 11/2017 | Rosenthal et al. |
| 9,840,061 | B2 | 12/2017 | Jaffee |
| 9,869,089 | B2 | 1/2018 | Thomas et al. |
| 9,896,807 | B2 | 2/2018 | Englert et al. |
| 9,909,310 | B2 | 3/2018 | Frank et al. |
| 9,922,634 | B2 | 3/2018 | Thompson, Jr. et al. |
| 10,119,211 | B2 | 11/2018 | Obert et al. |
| 10,368,502 | B2 | 8/2019 | Letton et al. |
| 11,111,372 | B2 | 9/2021 | Zhang et al. |
| 11,136,451 | B2 | 10/2021 | Zhang et al. |
| 12,139,599 | B2 * | 11/2024 | Zhang .................. C03C 25/285 |
| 12,297,342 | B2 * | 5/2025 | Mueller .................. C08K 7/14 |
| 12,359,355 | B2 * | 7/2025 | Smith .................. C08L 29/04 |
| 2003/0008978 | A1 | 1/2003 | Chen et al. |
| 2003/0060113 | A1 | 3/2003 | Christie et al. |
| 2003/0077546 | A1 * | 4/2003 | Donovan ................ G03C 1/76 |
| | | | 430/539 |
| 2004/0038017 | A1 | 2/2004 | Tutin et al. |
| 2004/0209074 | A1 | 10/2004 | Randall et al. |
| 2004/0219847 | A1 | 11/2004 | Miller |
| 2005/0059770 | A1 | 3/2005 | Srinivasan et al. |
| 2005/0215153 | A1 | 9/2005 | Cossement et al. |
| 2005/0284065 | A1 | 12/2005 | Shaffer |
| 2005/0288424 | A1 | 12/2005 | Fisler et al. |
| 2006/0036014 | A1 | 2/2006 | Hogan et al. |
| 2006/0078719 | A1 | 4/2006 | Miele |
| 2006/0079629 | A1 | 4/2006 | Taylor et al. |
| 2006/0101796 | A1 | 5/2006 | Kern et al. |
| 2006/0137799 | A1 | 6/2006 | Haque et al. |
| 2006/0168881 | A1 | 8/2006 | Straumietis |
| 2006/0216489 | A1 | 9/2006 | Shooshtari et al. |
| 2006/0217471 | A1 | 9/2006 | Shooshtari et al. |
| 2006/0252855 | A1 * | 11/2006 | Pisanova ................ D21H 17/06 |
| | | | 524/47 |
| 2007/0010651 | A1 | 1/2007 | Finch et al. |
| 2007/0125011 | A1 | 6/2007 | Weir et al. |
| 2007/0270066 | A1 | 11/2007 | Van Herwijnen et al. |
| 2007/0292619 | A1 | 12/2007 | Srinivasan et al. |
| 2008/0047548 | A1 | 2/2008 | Konietzny et al. |
| 2008/0138526 | A1 | 6/2008 | Tutin et al. |
| 2008/0152816 | A1 | 6/2008 | Clamen et al. |
| 2008/0176050 | A1 | 7/2008 | Lintz et al. |
| 2009/0036011 | A1 | 2/2009 | Hunig et al. |
| 2009/0156724 | A1 | 6/2009 | Espiard et al. |
| 2009/0208714 | A1 | 8/2009 | Currier et al. |
| 2010/0016143 | A1 | 1/2010 | Shooshtari et al. |
| 2010/0040832 | A1 | 2/2010 | Herbert |
| 2010/0064618 | A1 | 3/2010 | Boyd |
| 2010/0105272 | A1 | 4/2010 | Nandi et al. |
| 2010/0154300 | A1 | 6/2010 | Wiersma |
| 2010/0273006 | A1 | 10/2010 | Rodrigues et al. |
| 2010/0320113 | A1 | 12/2010 | Swift |
| 2011/0003522 | A1 | 1/2011 | Chen et al. |
| 2011/0159768 | A1 | 6/2011 | Crescimanno et al. |
| 2011/0189478 | A1 | 8/2011 | Zhang et al. |
| 2012/0064323 | A1 | 3/2012 | Shoemake et al. |
| 2012/0076983 | A1 | 3/2012 | Yu et al. |
| 2012/0168054 | A1 | 7/2012 | Chen et al. |
| 2012/0245277 | A1 | 9/2012 | Michl et al. |
| 2012/0311744 | A1 | 12/2012 | Sirkowski |
| 2013/0023174 | A1 | 1/2013 | Quinn |
| 2013/0026408 | A1 | 1/2013 | Jaffrennou et al. |
| 2013/0032749 | A1 | 2/2013 | Jaffrennou et al. |
| 2013/0084445 | A1 | 4/2013 | Haley et al. |
| 2013/0157030 | A1 | 6/2013 | Frick et al. |
| 2013/0244525 | A1 | 9/2013 | Chacko et al. |
| 2013/0334726 | A1 | 12/2013 | Hernandez-Torres et al. |
| 2014/0038485 | A1 | 2/2014 | Anderson et al. |
| 2014/0083328 | A1 | 3/2014 | Lochel, Jr. et al. |
| 2014/0120348 | A1 | 5/2014 | Didier et al. |
| 2014/0155353 | A1 | 6/2014 | Tezuka et al. |

(56)                References Cited

U.S. PATENT DOCUMENTS

| 2014/0186635 A1 | 7/2014 | Mueller |
| 2014/0245797 A1 | 9/2014 | Haley et al. |
| 2014/0350142 A1 | 11/2014 | Hansen et al. |
| 2015/0010730 A1 | 1/2015 | Faynot et al. |
| 2015/0027052 A1 | 1/2015 | Janssen et al. |
| 2015/0152244 A1 | 6/2015 | Hernandez-Torres |
| 2015/0373936 A1 | 12/2015 | Bouwens et al. |
| 2016/0088809 A1 | 3/2016 | Lowe et al. |
| 2016/0131299 A1 | 5/2016 | Mueller et al. |
| 2016/0143228 A1 | 5/2016 | De Groot et al. |
| 2016/0145779 A1 | 5/2016 | Teng et al. |
| 2016/0208439 A1 | 7/2016 | Lelogeay |
| 2016/0208483 A1 | 7/2016 | Takeuchi et al. |
| 2016/0219810 A1 | 8/2016 | Erkkila et al. |
| 2016/0264461 A1 | 9/2016 | Peng et al. |
| 2016/0280971 A1 | 9/2016 | Hampson et al. |
| 2016/0319537 A1 | 11/2016 | Rinne et al. |
| 2017/0022398 A1 | 1/2017 | Lochel, Jr. et al. |
| 2017/0037187 A1 | 2/2017 | Appley et al. |
| 2017/0150684 A1 | 6/2017 | Vuorinen et al. |
| 2017/0150687 A1 | 6/2017 | Loiske et al. |
| 2017/0190902 A1 | 7/2017 | Swift |
| 2017/0197379 A1 | 7/2017 | Teng et al. |
| 2017/0198142 A1 | 7/2017 | Hampson et al. |
| 2017/0210952 A1 | 7/2017 | Hampson et al. |
| 2017/0305783 A1 | 10/2017 | Faynot et al. |
| 2017/0332568 A1 | 11/2017 | Storey |
| 2017/0349718 A1 | 12/2017 | Albani et al. |
| 2017/0368792 A1 | 12/2017 | Faotto |
| 2018/0023291 A1 | 1/2018 | Wiker et al. |
| 2018/0031268 A1 | 2/2018 | Lopez Belbeze et al. |
| 2018/0037273 A1 | 2/2018 | Aarts et al. |
| 2018/0116131 A1 | 5/2018 | Leo |
| 2018/0139911 A1 | 5/2018 | Janssen |
| 2018/0312661 A1 | 11/2018 | Hernandez-Torres et al. |
| 2019/0106563 A1 | 4/2019 | Zhang et al. |
| 2019/0106564 A1 | 4/2019 | Zhang et al. |
| 2019/0124864 A1 | 5/2019 | Bassin et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2020/0270404 A1 | 8/2020 | Funakoshi et al. |
| 2021/0095156 A1 | 4/2021 | Swift et al. |
| 2021/0171757 A1* | 6/2021 | Mueller .................. C08K 3/40 |
| 2021/0172166 A1 | 6/2021 | Grant et al. |
| 2021/0395508 A1 | 12/2021 | Zhang et al. |
| 2022/0064408 A1 | 3/2022 | Zhang et al. |
| 2022/0106419 A1 | 4/2022 | Mueller et al. |
| 2022/0106492 A1 | 4/2022 | Click et al. |
| 2022/0213628 A1 | 7/2022 | Smith et al. |
| 2023/0348682 A1 | 11/2023 | Zhang et al. |

FOREIGN PATENT DOCUMENTS

| CA | 2834816 A1 | 11/2012 |
| CA | 2604809 C | 4/2013 |
| CN | 102533168 A | 7/2012 |
| EP | 0194242 B1 | 10/1989 |
| EP | 442811 B2 | 12/1993 |
| EP | 583086 B1 | 11/1997 |
| EP | 1022400 A1 | 7/2000 |
| EP | 826710 B1 | 9/2001 |
| EP | 715805 B1 | 7/2002 |
| EP | 1522532 A1 | 4/2005 |

| EP | 1038433 B1 | 6/2008 |
| EP | 2071066 A1 | 6/2009 |
| EP | 2093266 A1 | 8/2009 |
| EP | 2324089 A1 | 5/2011 |
| EP | 2268126 B1 | 4/2012 |
| EP | 1303672 B1 | 2/2015 |
| EP | 2690217 B1 | 3/2015 |
| EP | 2855601 B1 | 9/2016 |
| EP | 3034555 B1 | 4/2017 |
| EP | 2197928 A1 | 5/2017 |
| EP | 2694717 A1 | 6/2017 |
| EP | 2844621 B1 | 6/2017 |
| EP | 1656981 B1 | 1/2018 |
| EP | 1800853 B1 | 2/2018 |
| EP | 2755498 B1 | 2/2018 |
| EP | 2324089 B1 | 3/2018 |
| EP | 2231543 B1 | 9/2018 |
| JP | 2013151777 A | 8/2013 |
| JP | 2017106133 A | 6/2017 |
| JP | 2017226826 A | 12/2017 |
| JP | 2018119140 A | 8/2018 |
| WO | 9204824 A1 | 4/1992 |
| WO | 9318642 A1 | 9/1993 |
| WO | 9961384 A1 | 12/1999 |
| WO | 2004076734 A1 | 9/2004 |
| WO | 2004098270 A1 | 11/2004 |
| WO | 2006136389 A1 | 12/2006 |
| WO | 2007149644 A1 | 12/2007 |
| WO | 2008009460 A1 | 1/2008 |
| WO | 2008009462 A1 | 1/2008 |
| WO | 2008009465 A1 | 1/2008 |
| WO | 2009080822 A1 | 7/2009 |
| WO | 2011044490 A1 | 4/2011 |
| WO | 2012118939 A1 | 9/2012 |
| WO | 2013021234 A1 | 2/2013 |
| WO | 2015144843 A1 | 10/2015 |
| WO | 2016025987 A2 | 2/2016 |
| WO | 2017074853 A1 | 5/2017 |
| WO | 2017084853 A1 | 5/2017 |
| WO | 2017157525 A1 | 9/2017 |
| WO | 2018010558 A1 | 1/2018 |
| WO | 2018158677 A1 | 9/2018 |
| WO | 2019011693 A1 | 1/2019 |
| WO | 2019074867 A1 | 4/2019 |
| WO | 2020144436 A1 | 7/2020 |
| WO | 2021118951 A1 | 6/2021 |
| WO | 2022051213 A1 | 3/2022 |

OTHER PUBLICATIONS

Office Action from CN Application No. 202080036638.4 dated Apr. 30, 2024.
International Search Report and Written Opinion from PCT/US2020/026994 dated Jun. 16, 2020.
Office Action from CN Application No. 202080036638.4 dated Sep. 29, 2023.
Lee et al., "A Review on Citric Acid as Green Modifying Agent and Binder for Wood," Polymers, 2020; 12(8):1692, 21 pages.
Examiner's Report from CA Application No. 3,136,472 dated Jan. 22, 2025.
Office Action from EP Application No. 20786936.3 dated Feb. 24, 2025.
Office Action from KR Application No. 10-2021-7036375 dated Dec. 10, 2024.
Office Action from MX Application No. 21/12284 dated Jul. 8, 2025.
Office Action from EP Application No. 20786936.3 dated Jul. 30, 2025.
Office Action from MX Application No. 21/12284 dated Nov. 10, 2025.

* cited by examiner

PAA/PVOH with low amounts of Short Chain Polyol from 0 - 20:10

Interval Plot of Tensile (lb/LOI) 95% CI for the Mean

FIG. 16

AQUEOUS BINDER COMPOSITIONS

RELATED APPLICATIONS

This application is the U.S. national stage entry of International Application No. PCT/US2020/026994, filed Apr. 7, 2020, which claims priority to and the benefit of U.S. Provisional Application No. 62/831,222, filed Apr. 9, 2019, the entire contents of which are incorporated by reference herein.

BACKGROUND

Aqueous binder compositions are traditionally utilized in the formation of woven and non-woven fibrous products, such as insulation products, composite products, wood fiber board, and the like. Insulation products, for example fiberglass and mineral wool insulation products, are typically manufactured by fiberizing a molten composition of polymer, glass, or other mineral and spinning fine fibers from a fiberizing apparatus, such as a rotating spinner. To form an insulation product, fibers produced by a rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers. The blanket containing the binder-coated fibers is then passed through a curing oven and the binder is cured to set the blanket to a desired thickness.

After the binder has cured, the fiber insulation may be cut into lengths to form individual insulation products, and the insulation products may be packaged for shipping to customer locations.

Fiberglass insulation products prepared in this manner can be provided in various forms including batts, blankets, and boards (heated and compressed batts) for use in different applications. As the batt of binder-coated fibers emerges from the forming chamber, it will tend to expand as a result of the resiliency of the glass fibers. The expanded batt is then typically conveyed to and through a curing oven in which heated air is passed through the insulation product to cure the binder. In addition to curing the binder, within the curing oven, the insulation product may be compressed with flights or rollers to produce the desired dimensions and surface finish on the resulting blanket, batt or board product.

Phenol-formaldehyde (PF) binder compositions, as well as PF resins extended with urea (PUF resins), have been traditionally used in the production of fiberglass insulation products. Insulation boards, also known as "heavy density" products, such as ceiling board, duct wrap, duct liners, and the like have utilized phenol-formaldehyde binder technology for the production of heavy density products that are inexpensive and have acceptable physical and mechanical properties. However, formaldehyde binders emit undesirable emissions during the manufacturing of the fiberglass insulation.

As an alternative to formaldehyde-based binders, certain formaldehyde-free formulations have been developed for use as a binder in fiberglass insulation products. One of the challenges to developing suitable alternatives, however, is to identify formulations that have comparable mechanical and physical properties, while avoiding undesirable properties, such as discoloration. Such property challenges include hot/humid performance, stiffness, bond strength, processability (viscosity, cutting, sanding, edge painting), and achieving a light color without yellowing.

Accordingly, there is a need for an environmentally friendly, formaldehyde-free binder composition for use in the production of insulation products without experiencing a loss in physical and mechanical properties.

SUMMARY

Various exemplary aspects of the inventive concepts are directed to an aqueous binder composition comprising at least 35 wt. % of a cross-linking agent comprising at least two carboxylic acid groups, based on the total solids content of the aqueous binder composition, 0.1 to 50.0 wt. % of at least one long-chain polyol having at least two hydroxyl groups and a number average molecular weight of at least 2,000 Daltons, based on the total solids content of the aqueous binder composition; and optionally, at least one short-chain polyol having at least two hydroxyl groups and a number average molecular weight of less than 2,000 Daltons. The binder composition, once cured, includes no greater than 6.0 wt. % water soluble material.

In some exemplary embodiments, the cross-linking agent is a polymeric polycarboxylic acid, such as a homopolymer of copolymer of acrylic acid. The cross-linking agent may be present in the binder composition in an amount from 50 wt. % to 85 wt. %, based on the total solids content of the aqueous binder composition. In some exemplary embodiments, the cross-linking agent is present in the binder composition in an amount from 65 wt. % to 80 wt. %, based on the total solids content of the aqueous binder composition.

In various exemplary embodiments, the short-chain polyol is present in the binder composition in an amount from 1.0 wt. % to 50 wt. %, based on the total solids content of the aqueous binder composition. In various exemplary embodiments, the short-chain polyol comprises one or more of a sugar alcohol, 2,2-bis(methylol)propionic acid, tri(methylol)propane, and a short-chain alkanolamine. When the short-chain polyol comprises a sugar alcohol, the sugar alcohol may be selected from the group consisting of glycerol, erythritol, arabitol, xylitol, sorbitol, maltitol, mannitol, iditol, isomaltitol, lactitol, cellobitol, palatinitol, maltotritol, syrups thereof, and mixtures thereof.

In some exemplary embodiments, the long-chain polyol is selected from the group consisting of partially or fully hydrolyzed polyvinyl alcohol and polyvinyl acetate. The long-chain polyol may be present in the binder composition in an amount from 1 wt. % to 30 wt. %, based on the total solids content of the aqueous binder composition.

In various exemplary embodiments, the ratio of long-chain polyol to short-chain polyol is between 1/50 to 20/1.

In various exemplary embodiments, the binder composition has a water-soluble material content after cure of no greater than 5.0 wt. %.

Other exemplary aspects of the inventive concepts are directed to an aqueous binder composition comprising 0.1 to 50 wt. % of at least one long-chain polyol having at least two hydroxyl groups and a number average molecular weight of at least 2,000 Daltons, based on the total solids content of the aqueous binder composition; at least 35 wt. % of a cross-linking agent comprising at least two carboxylic acid groups, based on the total solids content of the aqueous binder composition; and 1.0 to 50 wt. % of at least one short-chain polyol having at least two hydroxyl groups and a number average molecular weight of less than 2,000 Daltons. The binder composition comprises a ratio of molar equivalents of carboxylic acid groups, anhydride groups, or salts thereof to molar equivalents of hydroxyl groups is from 1/0.05 to 1/20 and a ratio of long-chain polyol to short-chain polyol is between 1/50 and 20/1.

Other exemplary aspects of the inventive concepts are directed to a fibrous product comprising a plurality of randomly oriented fibers and an aqueous binder composition at least partially coating the fibers. The binder composition may comprise at least 35 wt. % of a cross-linking agent comprising at least two carboxylic acid groups, based on the total solids content of the aqueous binder composition, 0.1 to 50.0 wt. % of at least one long-chain polyol having at least two hydroxyl groups and a number average molecular weight of at least 2,000 Daltons, based on the total solids content of the aqueous binder composition; and optionally, at least one short-chain polyol having at least two hydroxyl groups and a number average molecular weight of less than 2,000 Daltons. The binder composition, once cured, includes no greater than 6.0 wt. % water soluble material.

The fibers of the insulation products may comprise one or more of mineral fibers, natural fibers, and synthetic fibers, and in some embodiments, the fibers comprise glass fibers.

In some exemplary embodiments, the fibrous product comprises any of an insulation product, a non-woven mat, particle board, ceiling board, duct board, and the like.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as illustrative embodiments and advantages thereof, are described below in greater detail, by way of example, with reference to the drawings in which:

FIG. 16 graphically illustrates the tensile force/LOI for fiberglass insulation made with exemplary binder compositions having polyacrylic acid and sorbitol or triethanolamine, with varying short-chain polyol to polyvinyl alcohol concentrations.

DETAILED DESCRIPTION

Figure 1:
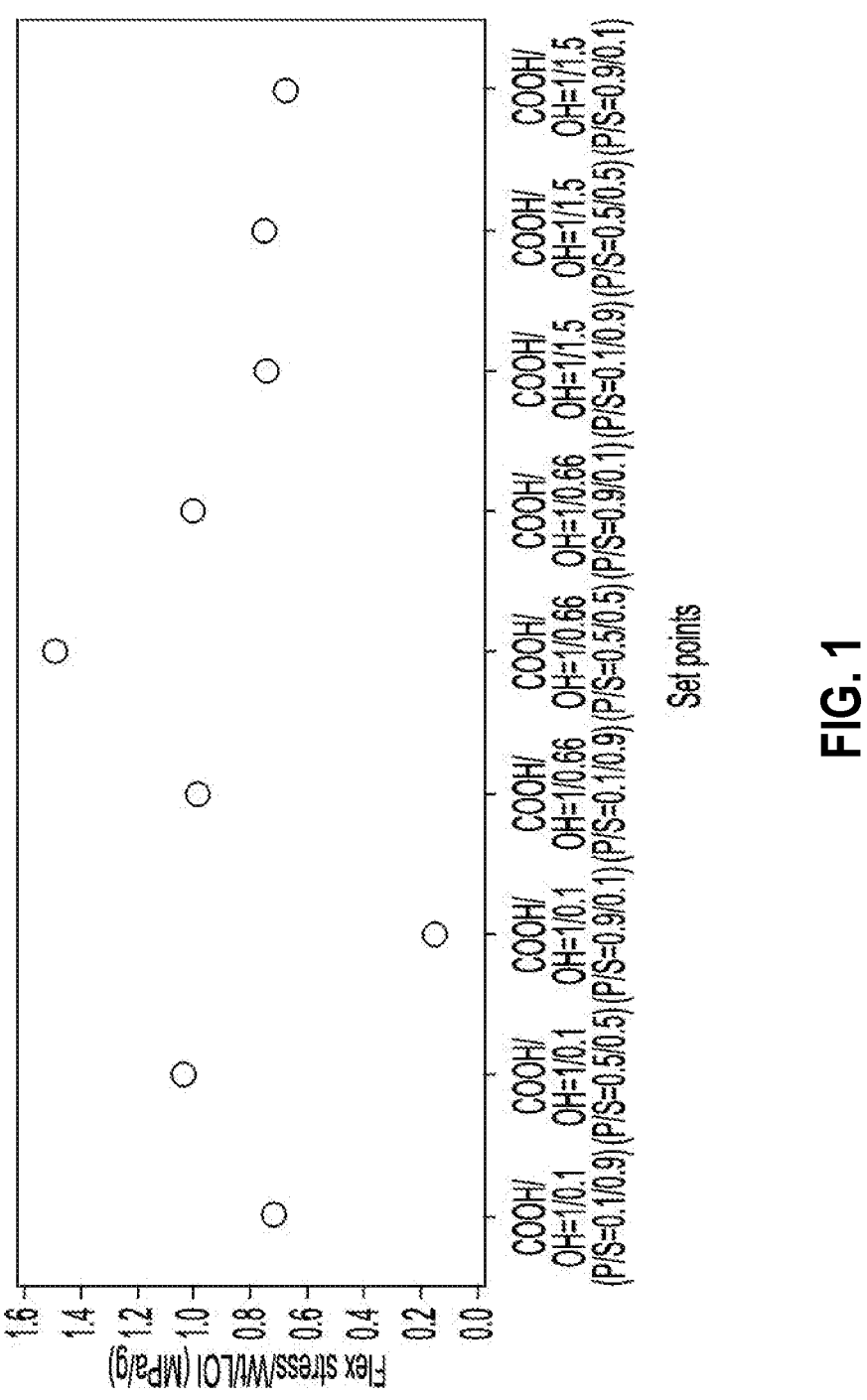
FIG. 1 graphically illustrates the flexural stress/wt./LOI for fiberglass insulation made with exemplary cured binder compositions having varying ratios of molar equivalent carboxylic acid groups/hydroxyl groups and long-chain polyol/short-chain polyol.

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The present disclosure relates to formaldehyde-free aqueous binder compositions for use in the manufacture of insulation products that have comparable or improved mechanical and physical performance, compared to products manufactured with traditional formaldehyde-based binder compositions. The formaldehyde-free binder composition may be used in the manufacture of fiber insulation products and related products, such as thin fiber-reinforced mats (all hereinafter referred to generically as fiber reinforced products) and glass fiber or mineral wool products, especially fiberglass or mineral wool insulation products, made with the cured formaldehyde-free binder. Other products may include composite products, wood fiber board products, metal building insulation, pipe insulation, ceiling board, ceiling tile, "heavy density" products, such as ceiling board, duct wrap, duct liners, and also "light density" products. Further fibrous products include non-woven fiber mats and particle boards, and composite products manufactured therefrom.

In some exemplary embodiments, the formaldehyde-free aqueous binder composition includes at least one primary cross-linking agent, and at least one secondary cross-linking agent comprising at least one short-chain polyol, and at least one long chain polyol.

The primary crosslinking agent may be any compound suitable for crosslinking the polyol. In exemplary embodiments, the primary crosslinking agent has a number average molecular weight greater than 90 Daltons, from 90 Daltons to 10,000 Daltons, or from 190 Daltons to 5,000 Daltons. In some exemplary embodiments, the crosslinking agent has a number average molecular weight of 2,000 Daltons to 5,000 Daltons, or 4,000 Daltons. Non-limiting examples of suitable crosslinking agents include materials having one or more carboxylic acid groups (—COOH), such as polycarboxylic acids (and salts thereof), anhydrides, monomeric and polymeric polycarboxylic acid with anhydride (i.e., mixed anhydrides), and homopolymer or copolymer of acrylic acid, such as polyacrylic acid (and salts thereof) and polyacrylic acid-based resins such as QR-1629S and Acumer 9932, both commercially available from The Dow Chemical Company. Acumer 9932 is a polyacrylic acid/sodium hypophosphite resin having a molecular weight of 4000 and a sodium hypophosphite content of 6-7% by weight. QR-1629S is a polyacrylic acid/glycerin mixture.

The primary cross-linking agent may, in some instances, be pre-neutralized with a neutralization agent. Such neutralization agents may include organic and/or inorganic bases, such sodium hydroxide, ammonium hydroxide, and diethylamine, and any kind of primary, secondary, or tertiary amine (including alkanol amine). In various exemplary embodiments, the neutralization agents may include at least one of sodium hydroxide and triethanolamine.

In some exemplary embodiments, the primary crosslinking agent is present in the aqueous binder composition in at least 50 wt. %, based on the total solids content of the aqueous binder composition, including, without limitation at least 55 wt. %, at least 60 wt. %, at least 63 wt. %, at least 65 wt. %, at least 70 wt. %, at least 73 wt. %, at least 75 wt. %, at least 78 wt. %, and at least 80 wt. %. In some exemplary embodiments, the primary crosslinking agent is present in the aqueous binder composition in an amount from 50% to 85% by weight, based on the total solids content of the aqueous binder composition, including without limitation 60% to 80% by weight, 62% to 78% by weight, and 65% to 75% by weight, including all endpoints and sub-combinations therebetween.

In some exemplary embodiments, the long-chain polyol comprises a polyol having at least two hydroxyl groups having a number average molecular weight of at least 2,000 Daltons, such as a molecular weight between 3,000 Daltons and 4,000 Daltons. In some exemplary embodiments, the long-chain polyol comprises one or more of a polymeric polyhydroxy compound, such as a polyvinyl alcohol, polyvinyl acetate, which may be partially or fully hydrolyzed, or mixtures thereof. Illustratively, when a partially hydrolyzed polyvinyl acetate serves as the polyhydroxy component, an 80%-89% hydrolyzed polyvinyl acetate may be utilized, such as, for example Poval® 385 (Kuraray America, Inc.) and Sevol™ 502 (Sekisui Specialty Chemicals America, LLC), both of which are 85% (Poval® 385) and 88% (Selvol™ 502) hydrolyzed.

The long-chain polyol may be present in the aqueous binder composition in an amount up to 50% by weight total solids, including without limitation, up to 40%, 35%, 30%, 28%, 25%, 20%, 18%, 15%, and 13% by weight total solids. In some exemplary embodiments, the long-chain polyol is present in the aqueous binder composition in an amount from 0.1 to 50% by weight total solids, including without limitation 0.5% to 30%, 1% to 20%, 5% to 18%, and 7% to 15%, by weight total solids, including all endpoints and sub-combinations therebetween.

Optionally, the aqueous binder composition includes a secondary crosslinking agent, such as a short-chain polyol. The short-chain polyol may comprise a water-soluble compound having a molecular weight of less than 2,000 Daltons, including less than 750 Daltons, less than 500 Daltons and having a plurality of hydroxyl (—OH) groups. Suitable short-chain polyol components include sugar alcohols, 2,2-bis(methylol)propionic acid (bis-MPA), tri(methylol)propane (TMP), Pentaaerythritol, and short-chain alkanolamines, such as triethanolamine. In some exemplary embodiments, the short-chain polyol serves as a viscosity reducing agent, which breaks down the intra and inter molecular hydrogen bonds between the long-chain polyol molecules (e.g., polyvinyl alcohol) and thus lowers the viscosity of the composition. However, as these small-chain polyol molecules have similar structures to the long-chain polyols, they can react similarly with cross-linking agents, thus they do not negatively impact the binder and product performance.

Sugar alcohol is understood to mean compounds obtained when the aldo or keto groups of a sugar are reduced (e.g. by hydrogenation) to the corresponding hydroxy groups. The starting sugar might be chosen from monosaccharides, oligosaccharides, and polysaccharides, and mixtures of those products, such as syrups, molasses and starch hydrolyzates. The starting sugar also could be a dehydrated form of a sugar. Although sugar alcohols closely resemble the corresponding starting sugars, they are not sugars. Thus, for instance, sugar alcohols have no reducing ability, and cannot participate in the Maillard reaction typical of reducing sugars. In some exemplary embodiments, the sugar alcohol includes glycerol, erythritol, arabitol, xylitol, sorbitol, maltitol, mannitol, iditol, isomaltitol, lactitol, cellobitol, palatinitol, maltotritol, syrups thereof and mixtures thereof. In various exemplary embodiments, the sugar alcohol is selected from glycerol, sorbitol, xylitol, and mixtures thereof. In some exemplary embodiments, the secondary cross-linking agent is a dimeric or oligomeric condensation product of a sugar alcohol. In various exemplary embodiments, the condensation product of a sugar alcohol is isosorbide. In some exemplary embodiments, the sugar alcohol is a diol or glycol.

In some exemplary embodiments, the short-chain polyol is present in the aqueous binder composition in an amount up to 50% by weight total solids, including without limitation, up to 40%, 35%, 30%, 25%, 20%, 18%, 15%, 13%, 11%, and 10% by weight total solids. In some exemplary embodiments, the short-chain polyol is present in the aqueous binder composition in an amount from 0 to 50% by weight total solids, including without limitation 2% to 45%, 1% to 35%, 5% to 30%, 7% to 27%, and 10% to 25%, by weight total solids, including all endpoints and sub-combinations therebetween.

In various exemplary embodiments, the long-chain polyol, crosslinking agent, and small-chain polyol are present in amounts such that the ratio of the number of molar equivalents of carboxylic acid groups, anhydride groups, or salts thereof to the number of molar equivalents of hydroxyl groups is from 1/0.05 to 1/20, including 1/0.3 to 1/10, such as from 1/0.1 to 1/5.0, from 1/0.3 to 1/3, and 1/0.4 to 1/2.5. It has surprisingly been discovered, however, that within this ratio, the ratio of long-chain polyol to short-chain polyol based on mol-equivalents of hydroxyl groups effects the performance of the binder composition, such as the tensile strength and water solubility of the binder after cure. For instance, it has been discovered that a ratio of long-chain polyol to short-chain polyol between 1/50 to 20/1, such as between 1/20 and 10/1, or between 1/10 and 5/1-2/1 1/1 provides a balance of desirable mechanical and physical properties. In various exemplary embodiments, the ratio of long-chain polyol to short-chain polyol is approximately 1/30. The ratio of long-chain polyol to short-chain polyol may be optimized such that particular properties are optimized, depending on the needs of an end-use application. For instance, lowering the long-chain polyol concentration may decrease the tensile strength of a product formed with the binder composition. However, lowering the long-chain polyol may affect other properties, such as physical properties. Thus, a balance between various properties has been unexpectedly struck within the ratios disclosed herein.

It has surprisingly been discovered that although long-chain polyols, such as polyvinyl alcohol generally have the highest viscosities among all binder ingredients, the addition of low amounts of long-chain polyol actually reduces the overall binder viscosity. In some exemplary embodiments, the addition of low amounts of long-chain polyol (0.1 to less than 20% by weight) reduces the viscosity of the binder solution up to 50%, based on the viscosity of the binder composition excluding the long-chain polyol. It has additionally been discovered that additions of low amounts of long-chain polyol simultaneously increases the tensile/LOI strength by up to 40% under both ambient and hot-humid conditions, compared to the tensile/LOI strength of a binder composition excluding the long-chain polyol.

Optionally, the aqueous binder composition may include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst.

The catalyst may be present in the aqueous binder composition in an amount from 0% to 10% by weight of the total solids in the binder composition, including without limitation, amounts from 1% to 5% by weight, or from 2% to 4.5% by weight, or from 2.8% to 4.0% by weight, or from 3.0% to 3.8% by weight.

Optionally, the aqueous binder composition may contain at least one coupling agent. In at least one exemplary embodiment, the coupling agent is a silane coupling agent. The coupling agent(s) may be present in the binder composition in an amount from 0.01% to 5% by weight of the total solids in the binder composition, from 0.01% to 2.5% by weight, from 0.05% to 1.5% by weight, or from 0.1% to 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyl-triethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Optionally, the aqueous binder composition may include a process aid. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from 0 to 10% by weight, from 0.1% to 5.0% by weight, or from 0.3% to 2.0% by weight, or from 0.5% to 1.0% by weight, based on the total solids content in the binder composition. In some exemplary embodiments, the aqueous binder composition is substantially or completely free of any processing aids.

Examples of processing aids include defoaming agents, such as, emulsions and/or dispersions of mineral, paraffin, or vegetable oils; dispersions of polydimethylsiloxane (PDMS) fluids, and silica which has been hydrophobized with polydimethylsiloxane or other materials. Further processing aids may include particles made of amide waxes such as ethylenebis-stearamide (EBS) or hydrophobized silica. A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluoronanoate, and perfluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), and polyoxyethylenealkylamines.

Suitable nonionic surfactants that can be used in conjunction with the binder composition include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy)ethanols having alkyl groups containing from 7 to 18 carbon atoms and having from 4 to 240 ethyleneoxy units (e.g., heptylphenoxypoly(ethyleneoxy) ethanols, and nonylphenoxypoly (ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from 6 to 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants include one or more of Dynol 607, which is a 2,5,8,11-tetramethyl-6-dodecyne-5,8-diol, SURFONYL® 420, SURFONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2-ethylhexyl) sodium sulfosuccinate), and Triton™ CF-10 (poly(oxy-1,2-ethanediyl), alpha-(phenylmethyl)-omega-(1,1,3,3-tetramethylbutyl)phenoxy).

The surfactant may be present in the binder composition in an amount from 0 to 10% by weight, from 0.1% to 5.0% by weight, or from 0.3% to 2.0% by weight, or from 0.5% to 1.0% by weight, based on the total solids content in the binder composition.

The binder composition may also include organic and/or inorganic acids and bases as pH adjusters in an amount sufficient to adjust the pH to a desired level. The pH may be adjusted depending on the intended application, to facilitate the compatibility of the ingredients of the binder composition, or to function with various types of fibers. In some exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a crosslinking agent. In other exemplary embodiment, organic and/or inorganic bases, can be included to increase the pH of the binder composition. In some exemplary embodiments, the bases may be a volatile or non-volatile base. Exemplary volatile bases include, for example, ammonia and alkyl-substituted amines, such as methyl amine, ethyl amine or 1-aminopropane, dimethyl amine, and ethyl methyl amine. Exemplary non-volatile bases include, for example, sodium hydroxide, potassium hydroxide, sodium carbonate, and t-butylammonium hydroxide.

The pH adjuster may be present in the binder composition in an amount from 0 to 10% by weight, from 0.1% to 5.0% by weight, or from 0.3% to 2.0% by weight, or from 0.5% to 1.0% by weight, based on the total solids content in the binder composition. In some exemplary embodiments, the aqueous binder composition is substantially or completely free of any pH adjuster.

When in an un-cured state, the pH of the binder composition may range from 2 to 5, including all amounts and ranges in between. In some exemplary embodiments, the pH of the binder composition, when in an un-cured state, is 2.2-4.0, including 2.5-3.8, and 2.6-3.5. After cure, the pH of the binder composition may rise to at least a pH of 6.0, including levels between 6.5 and 7.2, or between 6.8 and 7.2.

Optionally, the binder may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

In some exemplary embodiments, the aqueous binder composition includes up to 10 wt. % of a dust suppressing agent, including up to 8 wt. %, or up to 6 wt. %. In various exemplary embodiments, the aqueous binder composition includes between 0 wt. % and 10 wt. % of a dust suppressing agent, including 1.0 wt. % to 7.0 wt. %, or 1.5 wt. % to 6.5 wt. %, or 2.0 wt. % to 6.0 wt. %, or 2.5 wt. % to 5.8 wt. %.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise % to 35% by weight of binder solids, including without limitation, 10% to 30%, 12% to 20%, and 15% to 19% by weight of binder solids. This level of solids indicates that the subject binder composition may include more water than traditional binder compositions. However, due to the high cure rate of the binder composition, the binder can be processed at a high ramp moisture level (3%-30%) and the binder composition requires less cure residence time for moisture removal than In some exemplary embodiments, the binder composition is capable of achieving similar or higher performance than traditional phenolic or starch-hybrid binder compositions with lower LOI.

In some exemplary embodiments, the aqueous binder composition may also include one or more additives, such as a coupling agent, an extender, a crosslinking density enhancer, a deodorant, an antioxidant, a dust suppressing agent, a biocide, a moisture resistant agent, or combinations thereof. Optionally, the binder may comprise, without limitation, dyes, pigments, additional fillers, colorants, UV stabilizers, thermal stabilizers, anti-foaming agents, emulsifiers, preservatives (e.g., sodium benzoate), corrosion inhibitors, and mixtures thereof. Other additives may be added to the binder composition for the improvement of process and product performance. Such additives include lubricants, wetting agents, antistatic agents, and/or water repellent agents. Additives may be present in the binder composition from trace amounts (such as <0.1% by weight the binder composition) up to 10% by weight of the total solids in the binder composition.

In some exemplary embodiments, the aqueous binder composition is substantially free of a monomeric carboxylic acid component. Exemplary monomeric polycarboxylic acid components include aconitic acid, adipic acid, azelaic acid, butane tetra carboxylic acid dihydrate, butane tricarboxylic acid, chlorendic anhydride, citraconic acid, citric acid, dicyclopentadiene-maleic acid adducts, diethylenetriamine pentacetic acid pentasodium salt, adducts of dipentene and maleic anhydride, endomethylenehexachlorophthalic anhydride, ethylenediamine tetraacetic acid (EDTA), fully maleated rosin, maleated tall oil fatty acids, fumaric acid, glutaric acid, isophthalic acid, itaconic acid, maleated rosin-oxidize unsaturation with potassium peroxide to alcohol then carboxylic acid, malic acid, maleic anhydride, mesaconic acid, oxalic acid, phthalic anhydride, polylactic acid, sebacic acid, succinic acid, tartaric acid, terephthalic acid, tetrabromophthalic anhydride, tetrachlorophthalic anhydride, tetrahydrophthalic anhydride, trimellitic anhydride, and trimesic acid.

In various exemplary embodiments, the aqueous binder composition includes a long-chain polyol (e.g., fully or partially hydrolyzed polyvinyl alcohol), a primary crosslinking agent (e.g., polymeric polycarboxylic acid), and a secondary crosslinking agent (e.g. a sugar alcohol). The range of components used in the inventive binder composition according to certain exemplary embodiments is set forth in Table 1.

TABLE 1

| Component | Exemplary Range 1 (% By Weight of Total Solids) | Exemplary Range 2 (% By Weight of Total Solids) |
|---|---|---|
| Long-chain polyol | 0.1-50 | 1.0-20 |
| Crosslinking Agent | 35-85 | 65-80 |
| Short-chain polyol | 1.0-50 | 5.0-30 |
| Ratio of COOH/OH | 1/0.05 to 1/20 | 1/0.3 to 1/10 |
| Ratio long-chain polyol/short-chain polyol | 1/50 to 20/1 | 1/20 to 10/1 | traditional binder compositions. The binder content on a product may be measured as loss on ignition (LOI). In certain embodiments, the LOI on the glass fibers forming an insulation product is 0.5% to 50%, including without limitation, 1% to 25%, 5% to 19%, and 4.5% to 17%.

Aqueous binder compositions according to various exemplary embodiments of the present disclosure may further include a catalyst/accelerator (e.g., sodium hypophosphite), a surfactant, and/or a coupling agent (e.g., silane) are set forth in Table 2.

TABLE 2

| Component | Exemplary Range 1 (% By Weight of Total Solids) | Exemplary Range 2 (% By Weight of Total Solids) |
|---|---|---|
| Long-chain polyol | 0.1-50 | 1.0-20 |
| Crosslinking Agent | 35-85 | 65-80 |
| Short-chain polyol | 1.0-50 | 5.0-30 | part by the amount of carboxylic acid groups in the binder. Particularly, excess acid groups increase the water-soluble content leads to an increase in water soluble material post-cure. As shown in Table 3, below, Comparative Examples 1 and 2 have COOH/OH ratios that are highly acidic, resulting in an unacceptably high percentage of water soluble material after cure. In contrast, the percentage of water soluble material remaining after cure decreases substantially at COOH/OH ratios of 1/0.1 or less.

TABLE 3

| # | PAA | Sorbitol | PVOH | Ambient Tensile/ LOI | Hot/humid tensile/ LOI | Water soluble % | Set point ratio (P/S) = ratio of polyvinyl alcohol to sorbitol |
|---|---|---|---|---|---|---|---|
| Comp. Ex. 1 | 52.17% | 0 | 47.83% | 37.9 | 38.3 | 4.90% | COOH/OH = 1/1.5 (P/S = 1/0) |
| Comp. Ex. 2 | 95.96% | 0 | 4.04% | 38.0 | 32.0 | 51.7% | COOH/OH = 1/0.07(P/S = 1/0) |
| Comp. Ex. 3 | 61.28% | 38.72% | 0 | 39.7 | 40.4 | 6.5% | COOH/OH = 1/1.5(P/S = 0/1) |
| Comp. Ex. 4 | 95.96% | 4.04% | 0 | 44.3 | 38.7 | 15.9% | COOH/OH = 1/0.1(P/S = 0/1) |
| A | 61.84% | 27.51% | 10.65% | 39.1 | 37.4 | 1.5% | COOH/OH = 1/1.34(P/S = 0.21/0.79) |
| B | 61.84% | 8.15% | 30.01% | 39.5 | 38.8 | 2.6% | COOH/OH = 1/1.11 (P/S = 0.72/0.28) |
| C | 66.39% | 27.51% | 6.10% | 39.8 | 39.6 | 1.9% | COOH/OH = 1/1.13(P/S = 0.13/0.87) |
| D | 83.73% | 10.17% | 6.10% | 40.8 | 33.5 | 3.4% | COOH/OH = 1/0.41(P/S = 0.29/0.71) |
| E | 71.51% | 16.30% | 12.20% | 40.0 | 38.8 | 4.6% | COOH/OH = 1/0.82(P/S = 0.34/0.66) |
| F | 52.17% | 38.72% | 9.11% | 41.2 | 39.4 | 8.1% | COOH/OH = 1/2.05(P/S = 0.14/0.86) |
| G | 83.73% | 8.15% | 8.12% | 45.4 | 38.4 | 5.7% | COOH/OH = 1/0.39(P/S = 0.41/0.59) |
| H | 91.52% | 0 | 0.84% | 32.09 | 26.29 | 93.4% | COOH/OH = 1/0.02(P/S = 1/0) |

TABLE 2-continued

| Component | Exemplary Range 1 (% By Weight of Total Solids) | Exemplary Range 2 (% By Weight of Total Solids) |
|---|---|---|
| Catalyst | 1.0-5.0 | 2.0-4.0 |
| Coupling agent | 0.03-2.0 | 0.15-0.8 |
| Surfactant | 0.01-5.0 | 0.1-1.0 |

In some exemplary embodiments, the binder composition is formulated to have a reduced level of water soluble material post-cure as determined by extracting water-soluble materials with deionized water for 2 hours at room temperature using 1000 g of deionized water per 1 gram of binder. The higher the level of water soluble material after cure, the more likely it is that a cured material suffers from leaching if/when exposed to water and/or a hot/humid environment. In some exemplary embodiments, the binder composition has no greater than 6 wt. % of water soluble material after cure. In some exemplary embodiments, the binder composition has less than 5.0 wt. % water soluble material after cure, including less than 5.0 wt. %, 4.0 wt. %, 3.0 wt. %, less than 2.5 wt. %, less than 2.0 wt. %, less than 1.5 wt. %, or less than 1.0 wt. %. It has been discovered that reducing the level of water soluble material after cure to no greater than 6.0 wt. %, will improve the tensile strength of the binder composition, as compared to an otherwise similar binder composition having greater than 6.0 wt. %, water soluble material after cure.

The amount of water soluble material remaining in the binder composition after cure may be determined at least in It has further been discovered that the total polyol content should contain at least 10 wt. % of one or more short-chain polyols to produce a binder composition with an acceptably low level (e.g., no greater than 6 wt. %) of water soluble material after cure. This is particularly surprising since generally, short-chain polyols, such as sorbitol, have high water solubility. Thus, it would be expected that increasing the level of sorbitol would increase the amount of water-soluble material in the binder composition rather than lower it.

In some exemplary embodiments, the binder composition has a viscosity of 400 cP at 30% solids or less, including 300 cP at 30% solids or less, 200 cP at 30% solids or less, 175 cP at 30% solids or less, and 150 cP at 30% solids or less. In various exemplary embodiments, the viscosity of the binder composition is no greater than 250 cP at 30% solids or less.

The fibrous products of the present disclosure comprise a plurality of randomly oriented fibers. In certain exemplary embodiments, the plurality of randomly oriented fibers are mineral fibers, including, but not limited to glass fibers, glass wool fibers, mineral wool fibers, slag wool fibers, stone wool fibers, ceramic fibers, metal fibers, and combinations thereof.

Optionally, other reinforcing fibers such as natural fibers and/or synthetic fibers such as carbon, polyester, polyethylene, polyethylene terephthalate, polypropylene, polyamide, aramid, and/or polyaramid fibers may be used in the non-woven fiber mats. The term "natural fiber" as used herein refers to plant fibers extracted from any part of a plant, including, but not limited to, the stem, seeds, leaves, roots, or phloem. Examples of natural fibers suitable for use as the reinforcing fiber material include wood fibers, cellulosic fibers, straw, wood chips, wood strands, cotton, jute, bamboo, ramie, bagasse, hemp, coir, linen, kenaf, sisal, flax, henequen, and combinations thereof. The fibrous insulation products may be formed entirely of one type of fiber, or they may be formed of a combination of types of fibers. For example, the insulation products may be formed of combinations of various types of glass fibers or various combinations of different inorganic fibers and/or natural fibers depending on the desired application. In certain exemplary embodiments the insulation products are formed entirely of glass fibers.

Having generally described this invention, a further understanding can be obtained by reference to certain specific examples illustrated below which are provided for purposes of illustration only and are not intended to be all inclusive or limiting unless otherwise specified.

Example 1

Binder formulations with varying carboxylic acid/hydroxyl ratios and varying polyvinyl alcohol/sorbitol ratios were utilized to form thin boards (425° F. cure temp and 0.125-inch thickness) that were cut into strips. These ratios are depicted below in Table 4. Each board strip was subjected to a 3-point bend test, wherein a load was placed in the middle of each strip and the amount of load the board strip was able to withstand prior to break was measured. The results are depicted in FIG. 1.

TABLE 4

| Sample | COOH/OH ratio | PVOH/Sorbitol ratio |
|--------|---------------|---------------------|
| 1a | 1/0.1 | 0.1/0.9 |
| 1b | 1/0.1 | 0.5/0.5 |
| 1c | 1/0.1 | 0.9/0.1 |
| 2a | 1/0.66 | 0.1/0.9 |
| 2b | 1/0.66 | 0.5/0.5 |
| 2c | 1/0.66 | 0.9/0.1 |
| 3a | 1/1.5 | 0.1/0.9 |
| 3b | 1/1.5 | 0.5/0.5 |
| 3c | 1/1.5 | 0.9/0.1 |

As illustrated in FIG. 1, within each carboxylic acid/hydroxyl group ratio, the flex stress/weight/LOI increased or decreased depending on the polyvinyl alcohol/sorbitol ratio. Flex stress is a three-point bend test (i.e., force until breakage) utilizing a 2"×6" board with a ⅛" thickness. The highest flex stress/LOI overall was achieved when the carboxylic acid/hydroxyl group ratio was 1/0.66. Moreover, within this ratio, the flex stress/LOI was further increased when the polyvinyl alcohol/sorbitol ratio was 0.5/0.5. In fact, a polyvinyl alcohol/sorbitol ratio of 0.5/0.5 demonstrated the highest flex stress within each set of carboxylic acid/hydroxyl group ratios.

Example 2

Binder compositions with varying COOH/OH and long-chain polyol/short-chain polyol ratios were utilized to form non-woven fiberglass binder impregnated filter (BIF) sheets having a width of 9.5 mm, thickness of 0.5 mm, and a length of 97 mm. The non-woven fiberglass BIF sheets were cured for 3 minutes and 30 seconds at 425° F. The tensile strength, the Loss on Ignition (LOI) and tensile strength divided by the LOI (tensile strength/LOI) for each sample was determined under ambient conditions and steam ("hot/humid")

conditions. The tensile strength was measured using Instron (Pulling speed of 2 inches/min). The LOI of the reinforcing fibers is the reduction in weight experienced by the fibers after heating them to a temperature sufficient to burn or pyrolyze the binder composition from the fibers. The LOI was measured according to the procedure set forth in TAPPI T-1013 OM06, Loss on Ignition of Fiberglass Mats (2006). To create the hot/humid environment, the filter sheets were placed in an autoclave at 240° F. at a pressure between 400 and 500 psi for 60 minutes.

Figure 2:
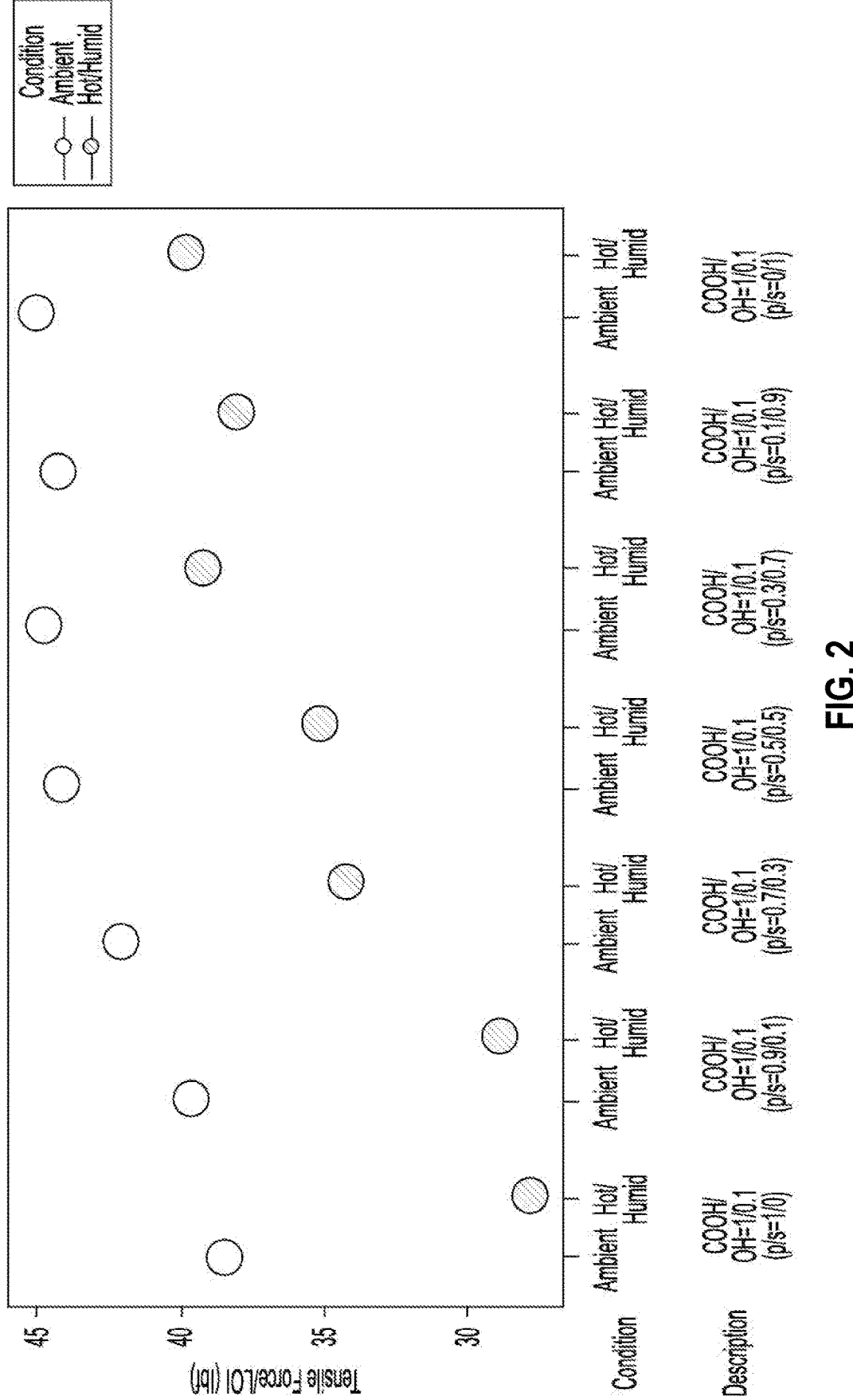
FIG. 2 graphically illustrates the tensile force/LOI for fiberglass made with exemplary binder compositions having a ratio of molar equivalent carboxylic acid groups/hydroxyl groups of 1/0.1 and varying long-chain polyol/short-chain polyol ratios.
Figure 3:
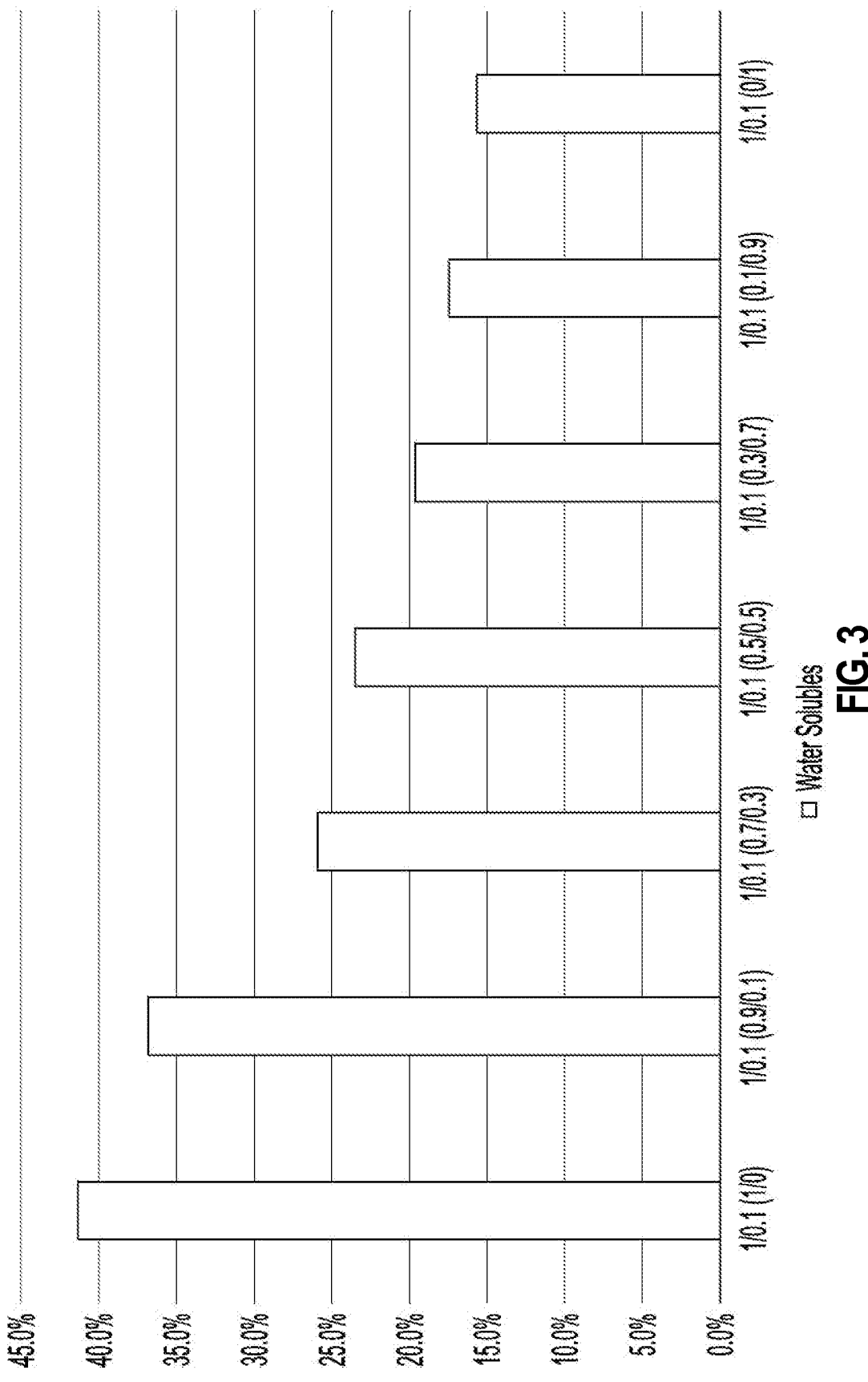
FIG. 3 graphically illustrates the % water soluble material post-cure for exemplary binder compositions having a ratio of molar equivalent carboxylic acid groups/hydroxyl groups of 1/0.1 and varying long-chain polyol/short-chain polyol ratios.

As illustrated in FIG. 2, the tensile/LOI appeared to generally increase in both ambient and hot/humid conditions when the ratio of short-chain polyol in the composition was increased (within a COOH/OH ratio of 1/0.1). This relationship appears consistent with the level of water solubles remaining in the composition after cure. (FIG. 3). FIG. 3 illustrates that as the ratio of short-chain polyol increases, the percentage of water soluble materials in the composition after cure decreases.

Figure 4:
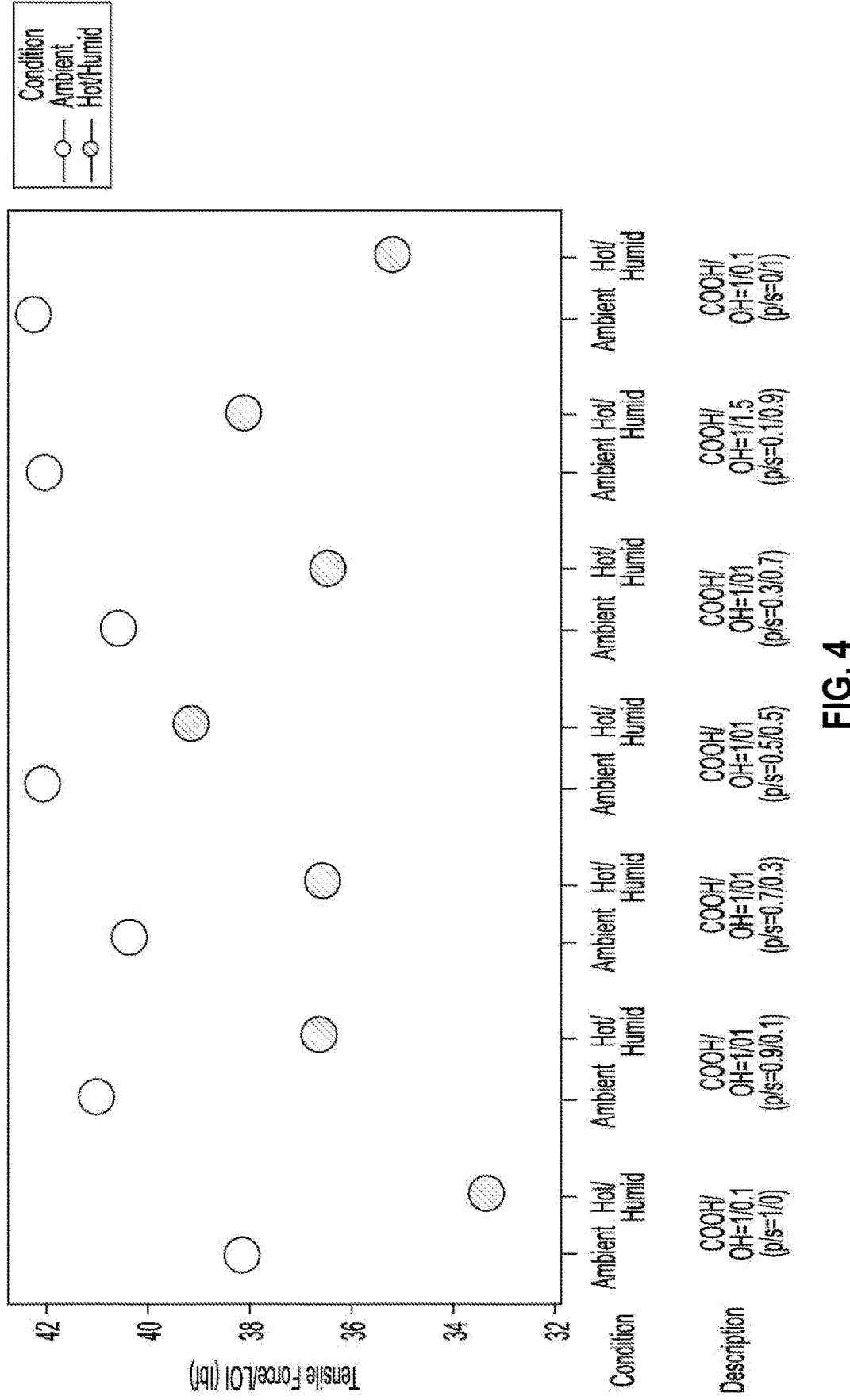
FIG. 4 graphically illustrates the tensile force/LOI for exemplary cured binder compositions having a ratio of molar equivalent carboxylic acid groups/hydroxyl groups of 1/1.5 and varying long-chain polyol/short-chain polyol ratios.
Figure 5:
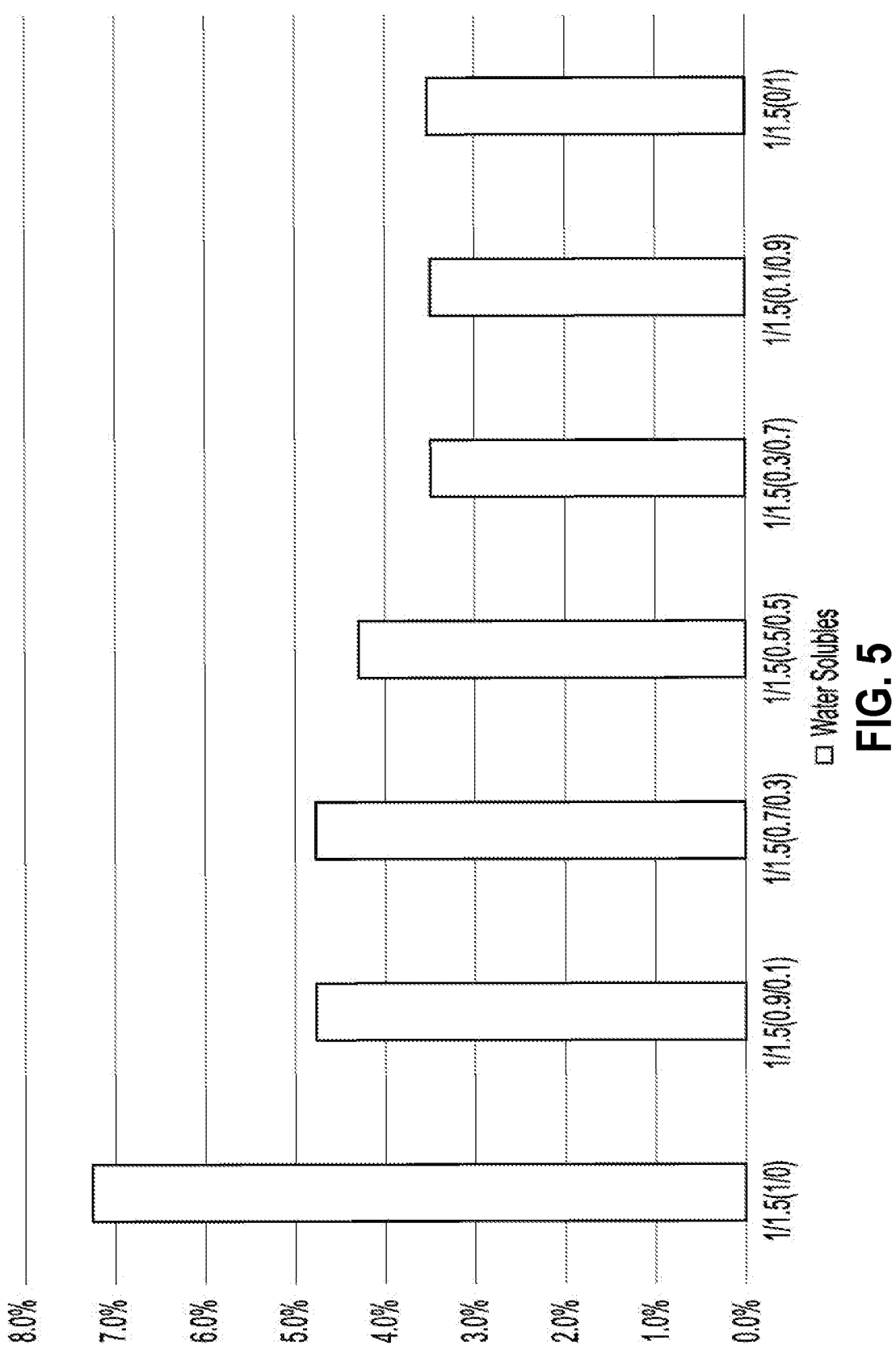
FIG. 5 graphically illustrates the % water soluble material post-cure for exemplary binder compositions having a ratio of molar equivalent carboxylic acid groups/hydroxyl groups of 1/1.5 and varying long-chain polyol/short-chain polyol ratios.
Figure 6:
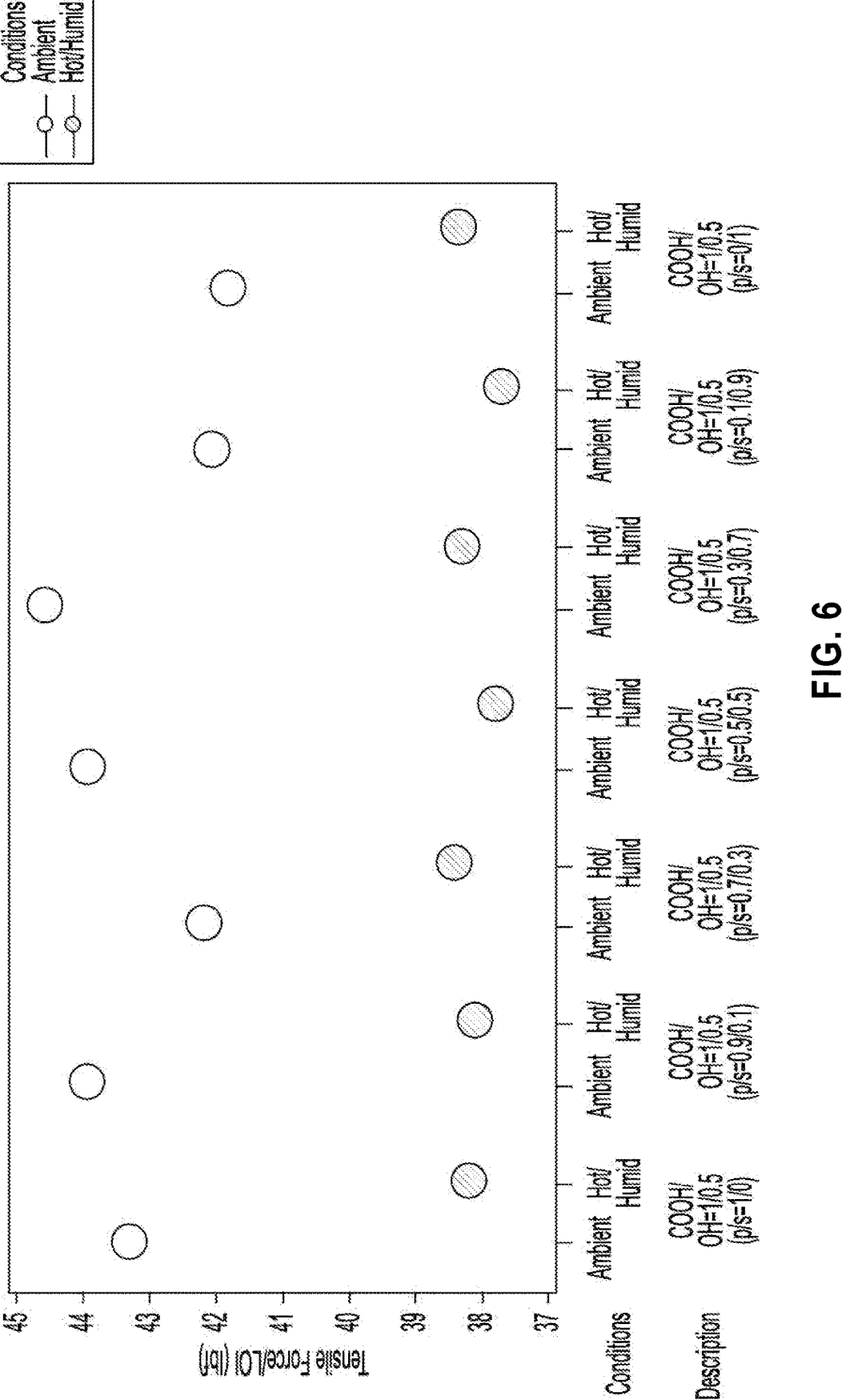
FIG. 6 graphically illustrates the tensile force/LOI for exemplary cured binder compositions having a ratio of molar equivalent carboxylic acid groups/hydroxyl groups of 1/0.5 and varying long-chain polyol/short-chain polyol ratios.
Figure 7:
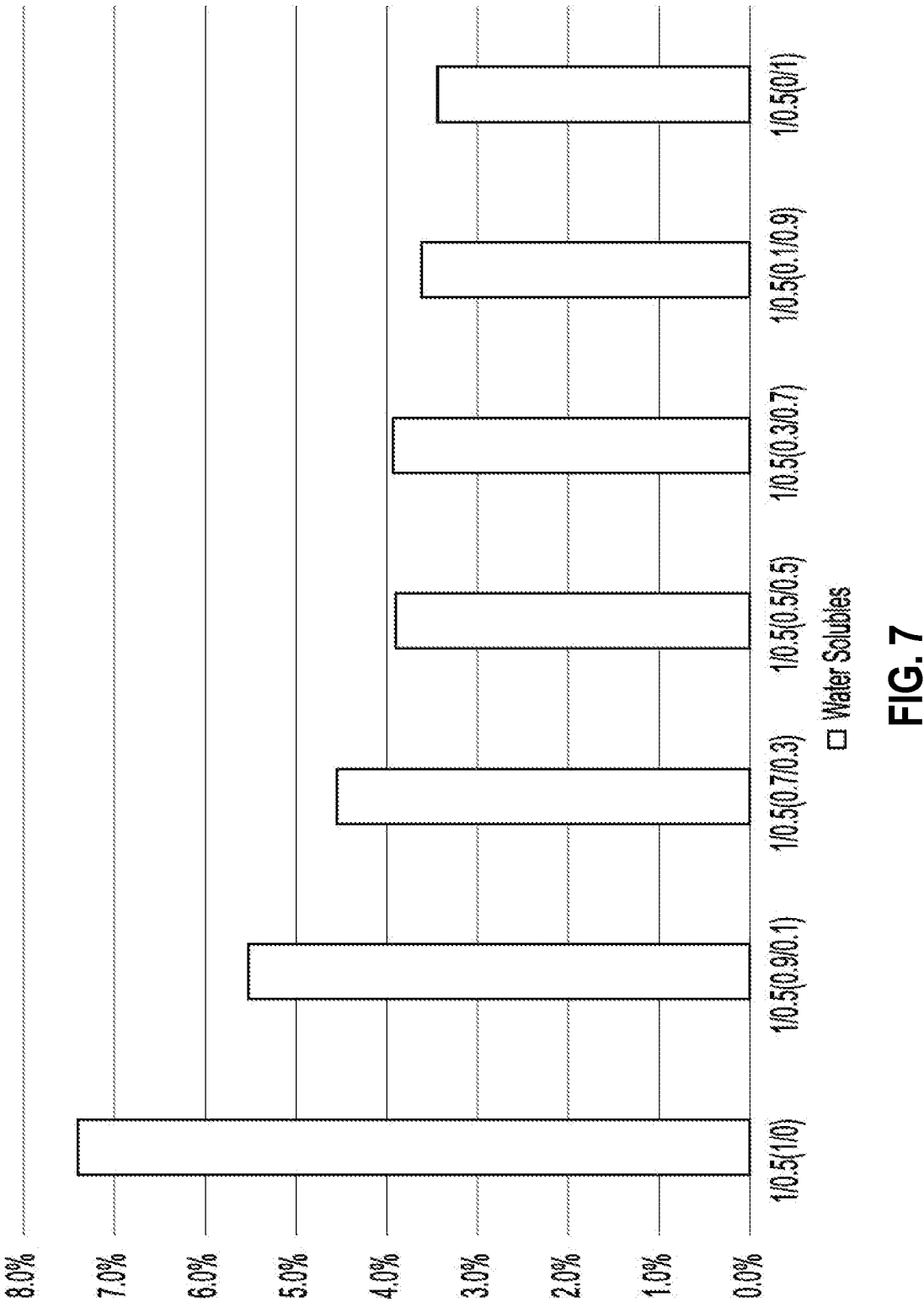
FIG. 7 graphically illustrates the % water soluble material post-cure for exemplary binder compositions having a ratio of molar equivalent carboxylic acid groups/hydroxyl groups of 1/0.5 and varying long-chain polyol/short-chain polyol ratios.
Figure 8:
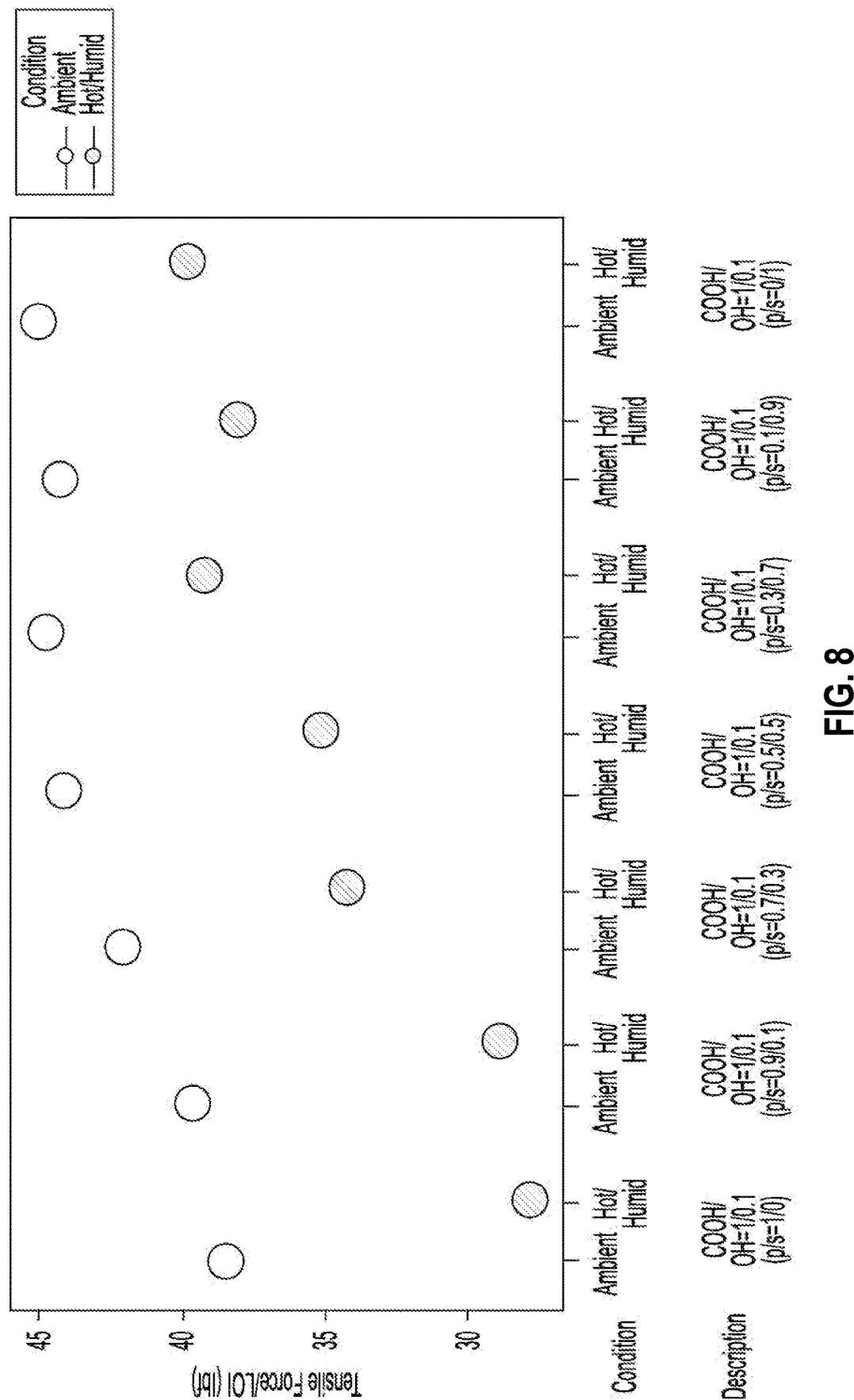
FIG. 8 graphically illustrates the tensile force/LOI for exemplary cured binder compositions having a ratio of molar equivalent carboxylic acid groups/hydroxyl groups of 1/0.1 and varying long-chain polyol/short-chain polyol ratios.
Figure 9:
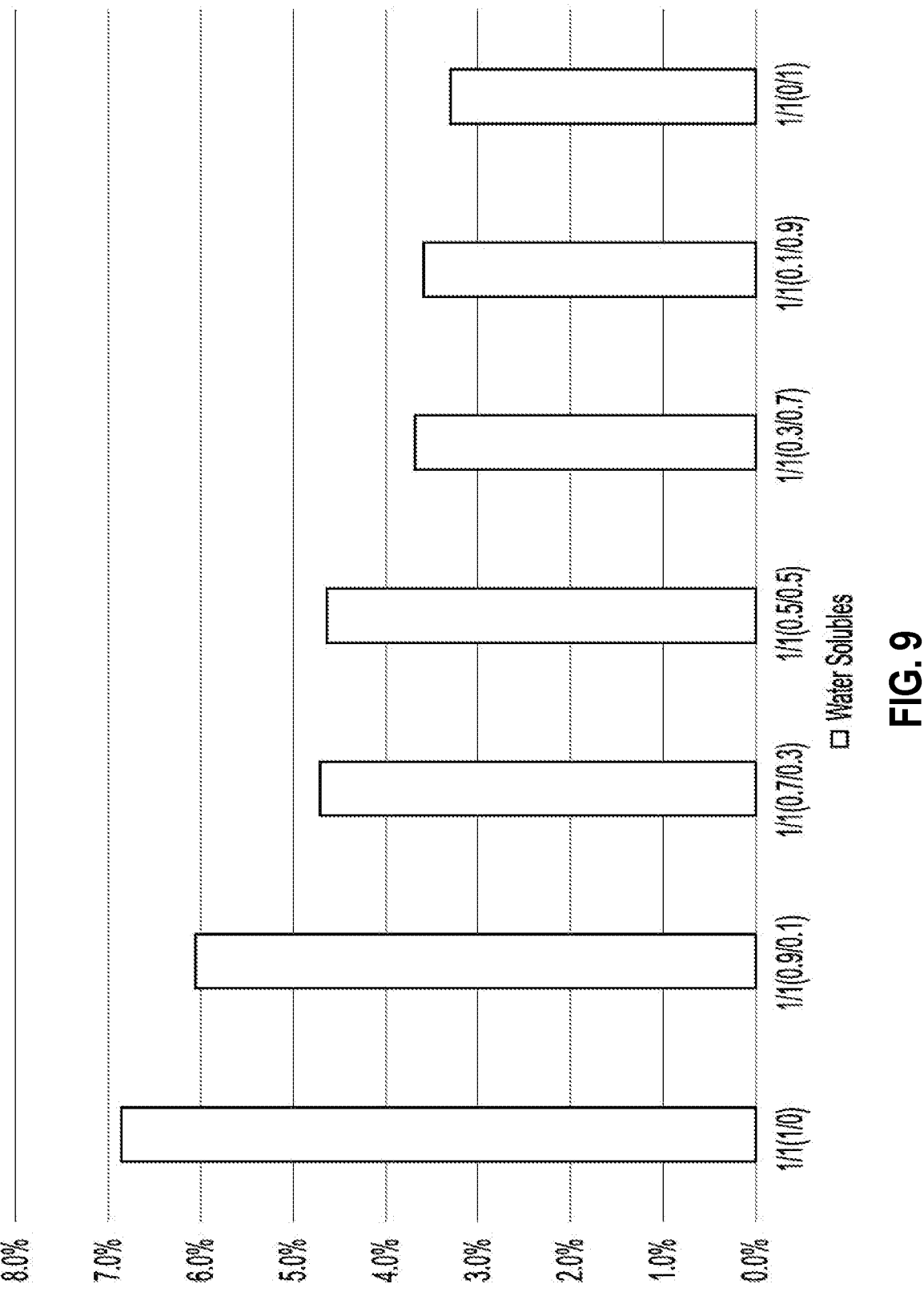
FIG. 9 graphically illustrates the % water soluble material post-cure for exemplary binder compositions having a ratio of molar equivalent carboxylic acid groups/hydroxyl groups of 1/1 and varying long-chain polyol/short-chain polyol ratios.

These relationships continue when the COOH/OH ratio is adjusted to 1/1.5, as illustrated in FIGS. 4 and 5. However, notably, the percentage of water soluble materials remaining in the composition after cure is substantially lower at this COOH/OH range. For instance, even in a composition lacking any short-chain polyol, the percentage water soluble material is less than 8.0% and after some short-chain polyol is added, the percentage drops below 5.0%.

As the COOH/OH ratio is adjusted to 1/0.5, 1/0.1, and 1/1, however, although the percent water soluble material similarly declines with increasing ratio of short-chain polyol, both the ambient and hot/humid tensile strengths remained relatively constant regardless of the long-chain/short-chain polyol ratio. See FIGS. 6 through 9. It should be noted, however, that the highest ambient tensile strengths/LOI were demonstrated at long-chain/short-chain polyol ratios of 0.5/0.5 and 0.3/0.7, when the COOH/OH ratio was 1/0.5 (tensile strengths/LOI of 44 and 45, respectively).

Figure 10:
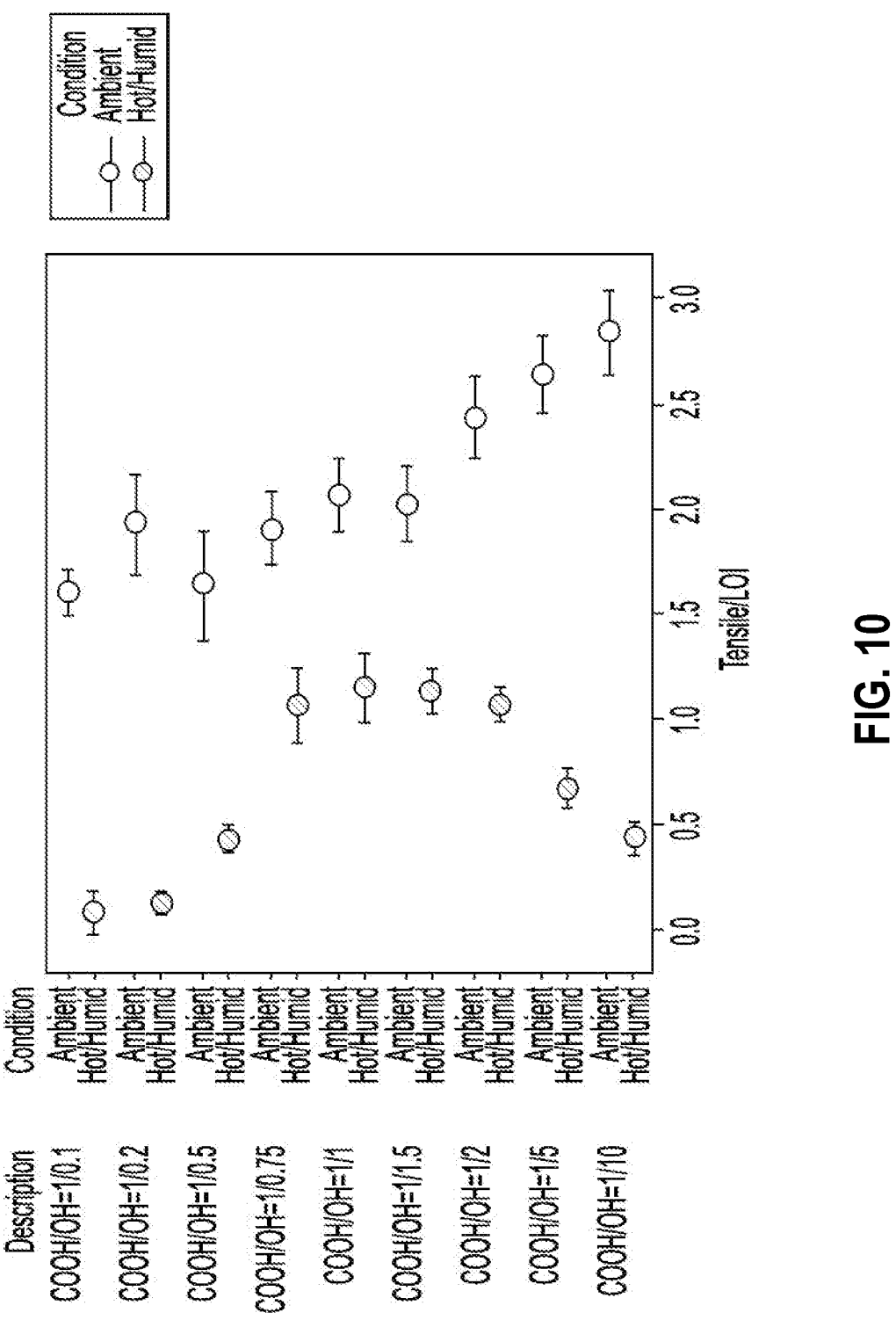
FIG. 10 graphically illustrates the tensile force/LOI for exemplary cured binder compositions having varied ratios of molar equivalent carboxylic acid groups/hydroxyl groups.

FIG. 10 illustrates the shift in tensile/LOI for filter sheets impregnated with binder compositions having varying COOH/OH ratios from 1/0.1 to 1/10. As illustrated, the optimal tensile/LOI under both ambient and hot/humid conditions can be seen when the COOH/OH ratio is not too low or too high. At both too high or too low COOH/OH ratios, the hot/humid tensile/LOI suffers, which leads to insufficient strength properties.

Example 3

Binder compositions with varying ratios were utilized to form fiberglass insulation board (e.g., ceiling tiles). The insulation boards formed with binder compositions according to the preset application (labeled as PAA/S/PVOH in various ratios of polyacrylic acid/sorbitol/polyvinyl alcohol) were compared to boards formed using both a conventional carbohydrate-based binder composition ("Starch-Hybrid Binder Board") and a phenol urea formaldehyde binder composition ("PUF Board"). The elastic modulus, compressive strength (delta b), and sag (inches) for each sample was determined under ambient conditions.

Figure 11:
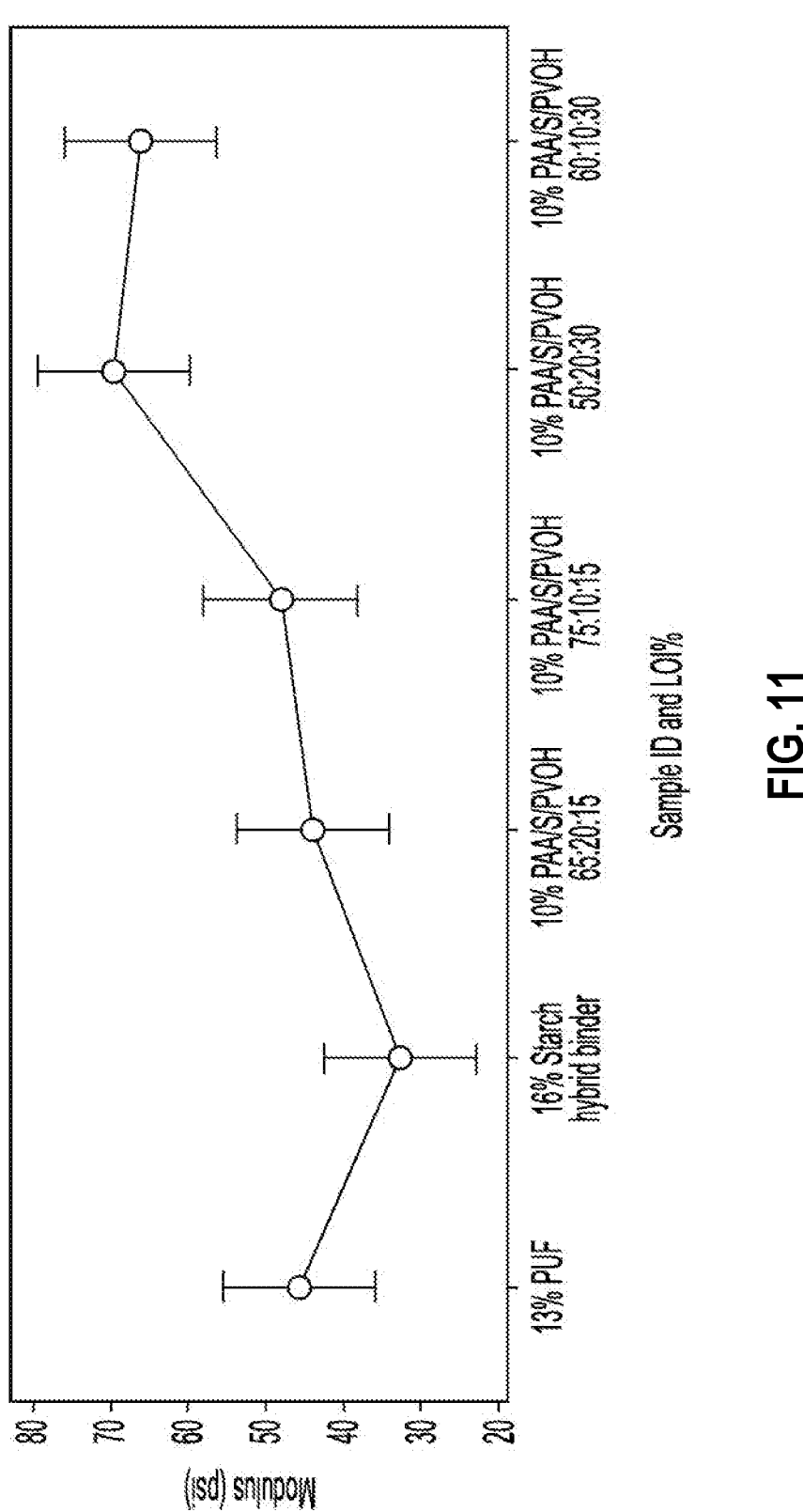
FIG. 11 graphically illustrates the flexural elastic modulus for plant trial boards formed using various binder compositions in accordance with the subject application, compared to conventional starch-hybrid binder compositions and phenol urea formaldehyde-based binder compositions.

As illustrated in FIG. 11, each of the PAA/S/PVOH insulation board samples demonstrated improved Flexural Elastic Modulus, as compared to both conventional carbohydrate-based binder compositions and phenol urea formaldehyde-based binder compositions. PAA/S/PVOH 50:20:30 and PAA/S/PVOH 60:10:30 demonstrated the greatest improvement, with Flexural Elastic Modulus levels at 70 psi and 68 psi, respectively. In contrast, the PUF Board demonstrated a Flexural Elastic Modulus of 46 psi and the Starch-Hybrid Binder Board demonstrated an elastic modulus of 31 psi. In some exemplary embodiments, an insulation board with a thickness of 1 inch and a density of 6 lbs/ft$^3$ according to the present inventive concepts achieves an elastic modulus of at least 40 psi, including at least 45 psi, at least 50 psi, and at least 55 psi.

Figure 12:
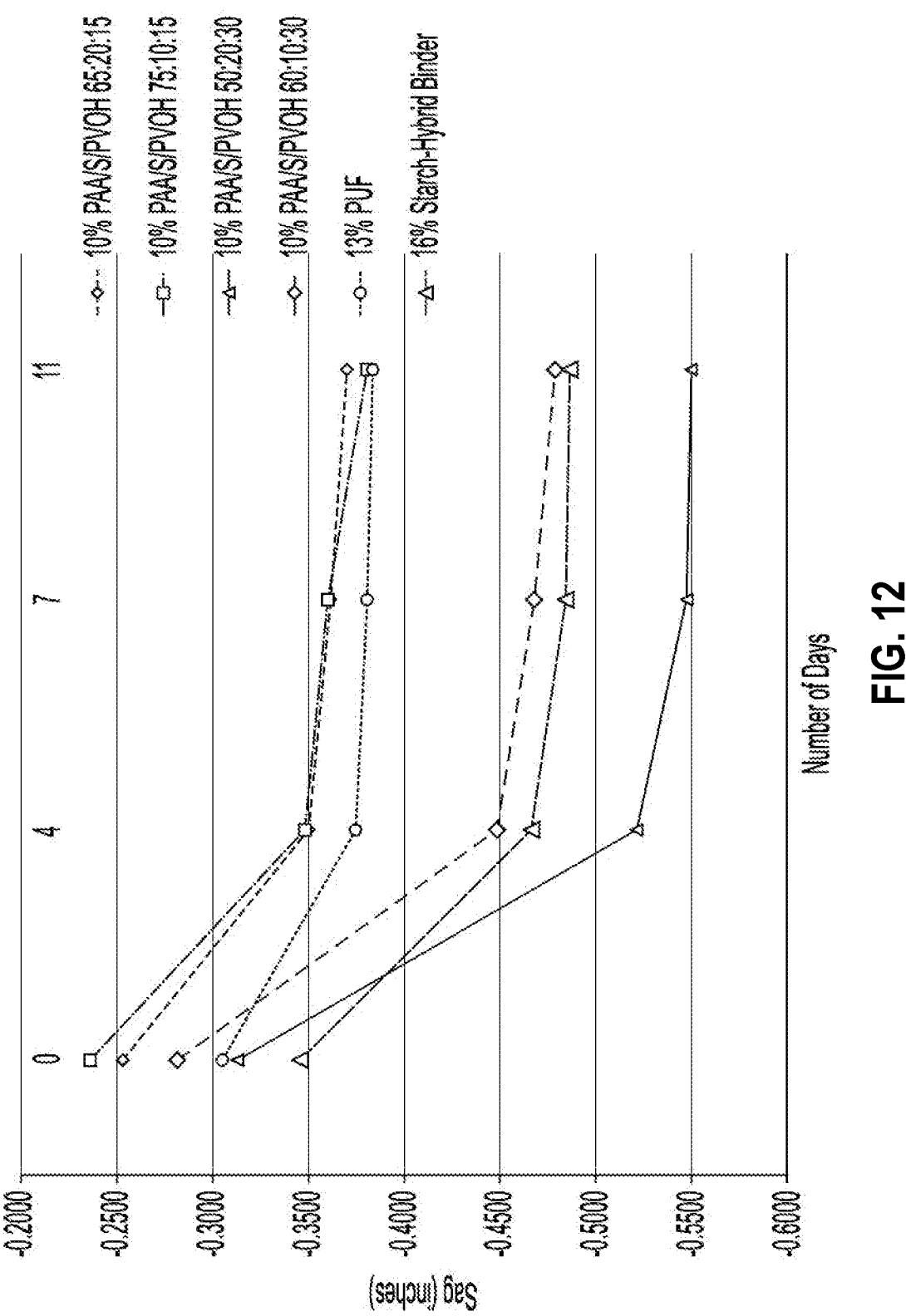
FIG. 12 graphically illustrates the sag for 4'×4' fiberglass insulation ceiling board tiles formed using various binder compositions in accordance with the subject application, compared to conventional starch-hybrid binder compositions and phenol urea formaldehyde-based binder compositions under hot/humid conditions.

FIG. 12 illustrates the sag observed by various 4'×4' insulation board panels after a set number of days in a hot/humid environment at 90 F/90% rH (relative humidity).

As shown in FIG. 12, the PAA/S/PVOH binder compositions having lower levels of PVOH (i.e., PAA/S/PVOH 60:20:15 and PAA/S/PVOH 75:10:15) demonstrated less sag under hot/humid conditions than both PUF Board and Starch-Hybrid Binder Board. This indicates that lowering the long-chain polyol in the binder compositions may help improve the hot/humid performance in applications that need very high standard of hot and humid performances.

Figure 13:
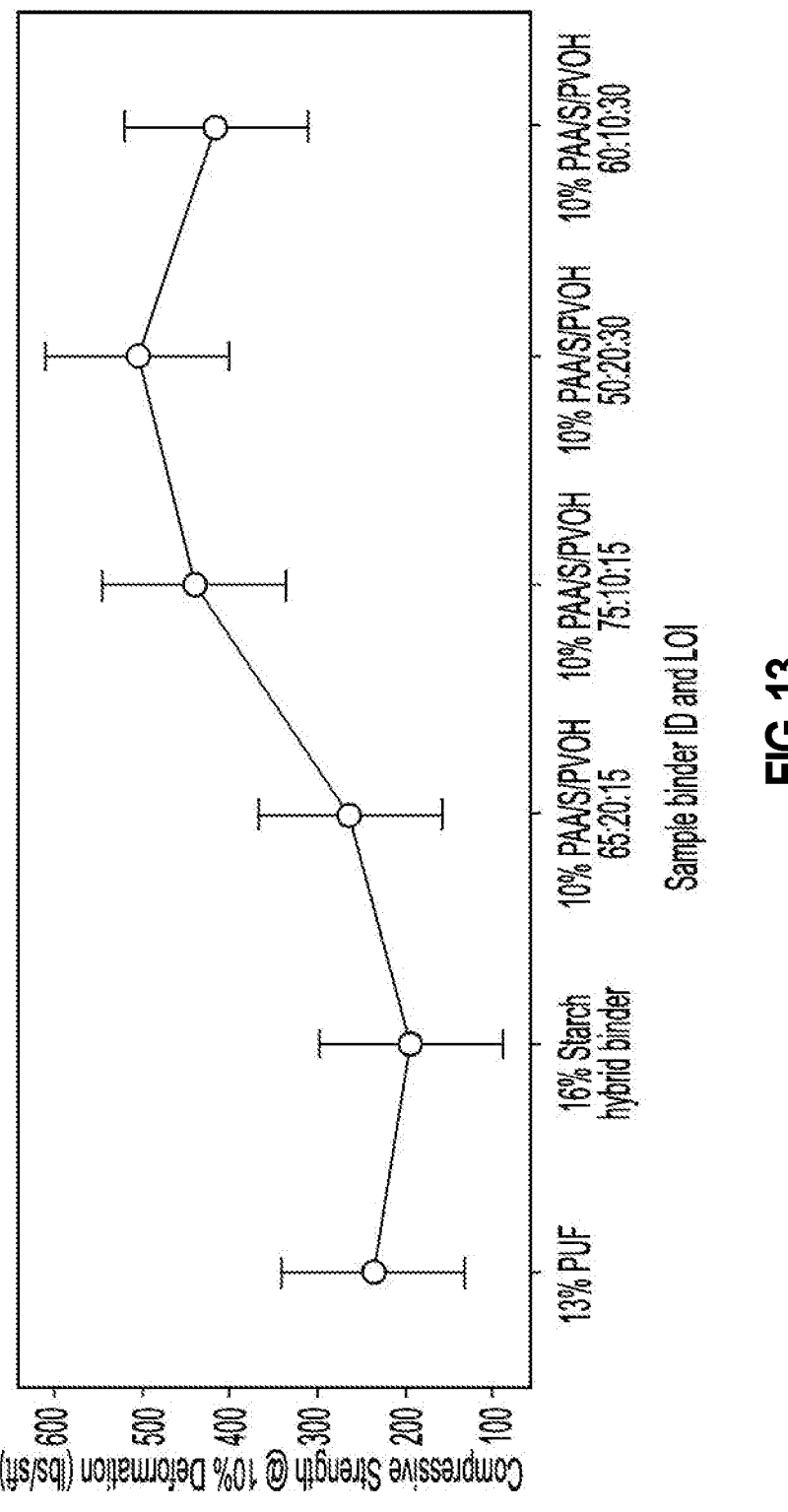
FIG. 13 graphically illustrates the compressive strength of plant trial board products, formed using various binder compositions in accordance with the subject application, compared to conventional starch-hybrid binder compositions and phenol urea formaldehyde-based binder compositions.

FIG. 13 illustrates the compressive strength at 10% deformation of fiberglass board products of different binders and LOI %. The test was performed on 6"×6" insulation boards, with a thickness 1" and density 6 lb/ft$^2$, according to ASTM method C-165. As illustrated in FIG. 13, the compressive strength of the insulation boards formed with a PAA/S/PVOH binder exceeded that of insulation boards formed with both a starch-hybrid binder and a PUF binder, demonstrating compressive strengths of 260 lbs/ft$^2$ to over 500 lbs/ft$^2$. In some exemplary embodiments, a 6"×6" insulation board with a thickness of 1 inch according to the present inventive concepts achieves a compressive strength of at least 200 lbs/ft$^2$, including at least 300 lbs/ft$^2$, at least 400 lbs/ft$^2$, and at least 500 lbs/ft$^2$.

Figure 14:
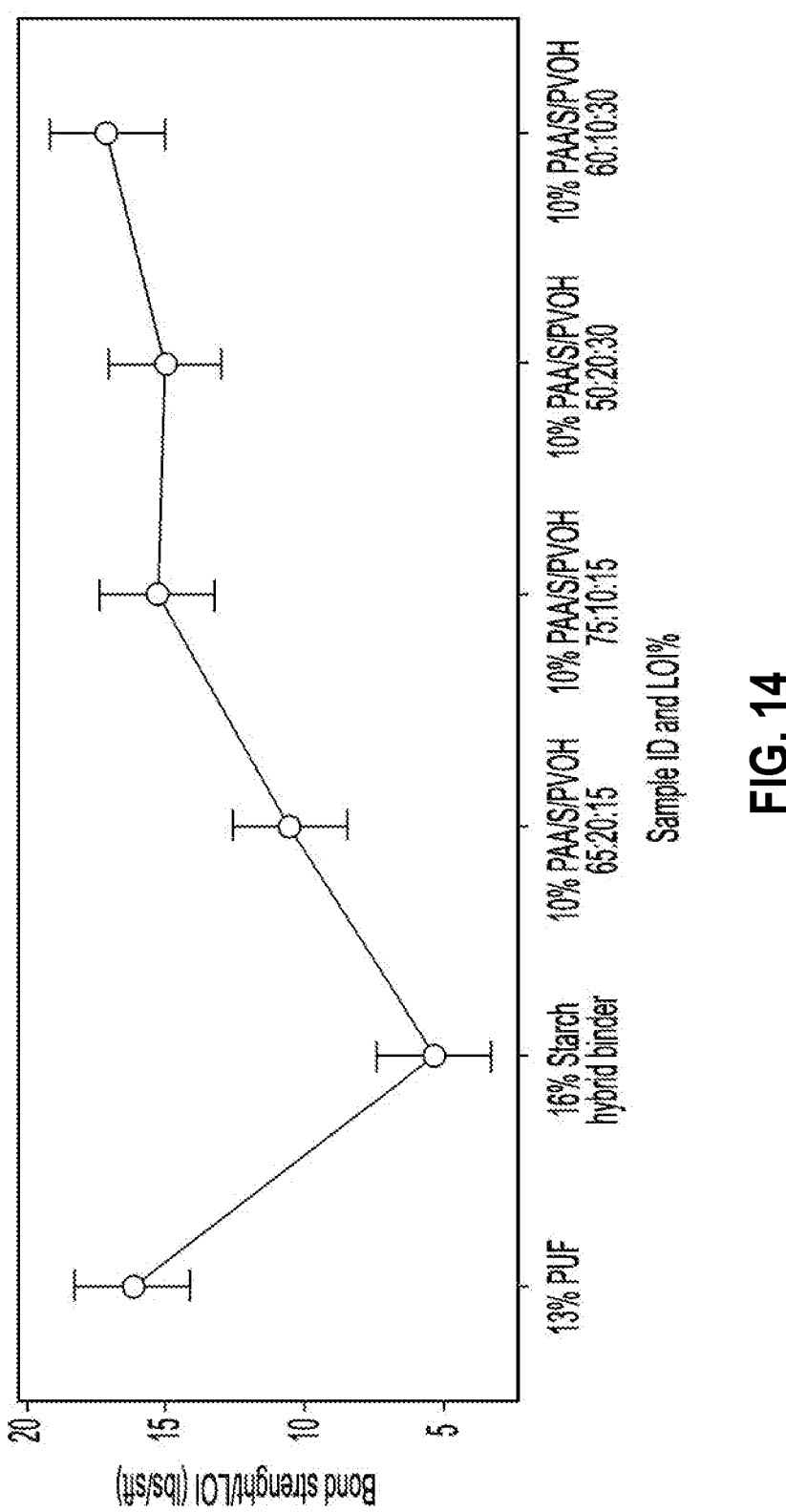
FIG. 14 graphically illustrates the bond strength at break of plant trial board products formed using various binder compositions in accordance with the subject application, compared to conventional starch-hybrid binder compositions and phenol urea formaldehyde-based binder compositions.
Figure 15:
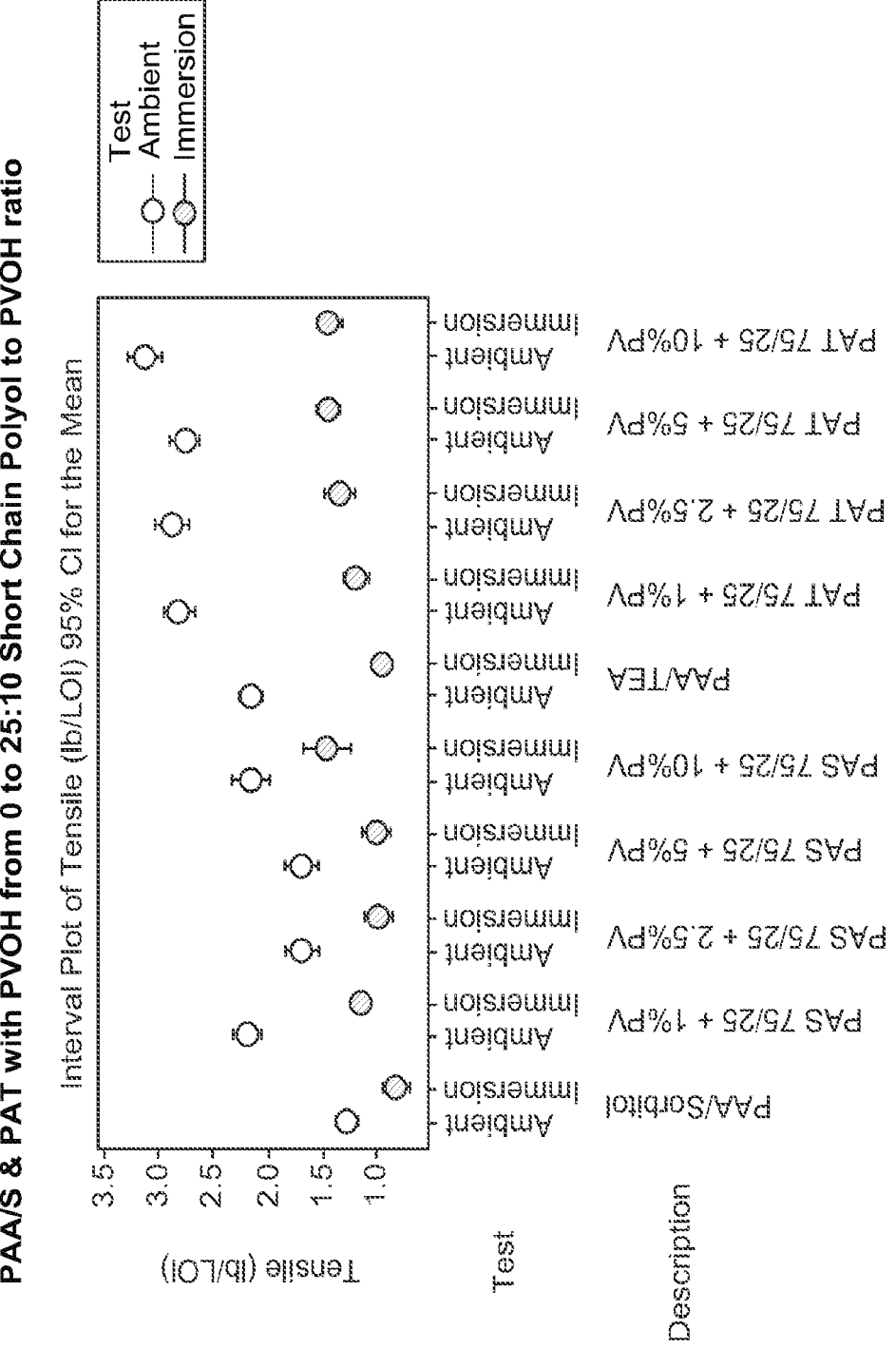
FIG. 15 graphically illustrates the tensile force/LOI for fiberglass insulation made with exemplary binder compositions comprising polyacrylic acid and polyvinyl alcohol and having varying low levels of sorbitol concentrations.

FIG. 14 illustrates the bond strength at break of fiberglass board products of different binders and LOI %. The test measures the strength in Z direction of 6"×6" insulation boards with a thickness of 1" and density of 6 lb/ft$^2$. As illustrated in FIG. 14, the bond strength of insulation boards formed with PAA/S/PVOH binders exceeded that of insulation board formed with a starch-hybrid binder. Additionally, the insulation boards formed with PAA/S/PVOH binders demonstrated a comparable bond strength to insulation boards formed with a PUF binder, demonstrating bond strengths of 10 lbs/ft$^2$ to over 15 lbs/ft$^2$. In some exemplary embodiments, a 6"×6" insulation board with a thickness of 1 inch according to the present inventive concepts achieves a bond strength of at least 7.5 lbs./ft$^2$/LOI, including at least 10 lbs./ft$^2$/LOI, at least 12.5 lbs./ft$^2$/LOI, and at least 15 lbs./ft$^2$/LOI.

Example 4

Binder compositions comprising 75 wt. % polyacrylic acid and varying amounts of polyvinyl alcohol and sorbitol (Table 5) or triethanolamine (Table 6) were utilized to form non-woven fiberglass binder impregnated filter (BIF) sheets having a width of 9.5 mm, thickness of 0.5 mm, and a length of 97 mm. The non-woven fiberglass BIF sheets were cured for 3 minutes and 30 seconds at 425° F. in a forced-air oven. The tensile strength divided by the LOI (tensile strength/LOI) for each sample was determined under ambient conditions and steam ("hot/humid") conditions. The tensile strength was measured using Instron (Pulling speed of 2 inches/min). The LOI of the reinforcing fibers is the reduction in weight experienced by the fibers after heating them to a temperature sufficient to burn or pyrolyze the binder composition from the fibers. The LOI was measured according to the procedure set forth in TAPPI T-1013 OM06, Loss on Ignition of Fiberglass Mats (2006). To create the hot/humid environment, the filter sheets were placed in an autoclave at 227° F. at a pressure of 5 psi for 60 minutes. The binder compositions tested are detailed below in Table 5.

TABLE 5

| # | PAA | Sorbitol | PVOH | Ambient Tensile (lb/LOI) (lbf) | Hot/humid tensile/ LOI |
|---|-----|----------|------|-------------------------------|------------------------|
| Comp. Ex. A | 75% | 25% | 0 | 1.27 | 0.82 |
| 1 | 75% | 25% | 1% | 2.18 | 1.14 |
| 2 | 75% | 25% | 2.5% | 1.68 | 0.97 |
| 3 | 75% | 25% | 5% | 1.68 | 0.99 |
| 4 | 75% | 25% | 10% | 2.15 | 1.45 |
| 5 | 75% | 10% | 20% | 2.41 | 1.25 |
| 6 | 75% | 5% | 20% | 2.30 | 1.65 |
| 7 | 75% | 2.5% | 20% | 2.08 | 1.28 |
| 8 | 75% | 1% | 20% | 1.78 | 1.23 |
| Comp. Ex. B | 75% | 0 | 20% | 2.06 | 1.20 |

TABLE 6

| # | PAA | TEA | PVOH | Ambient Tensile (lb/LOI) (lbf) | Hot/humid tensile/ LOI |
|---|-----|-----|------|-------------------------------|------------------------|
| Comp. Ex. C | 75% | 25% | 0 | 2.15 | 0.94 |
| 10 | 75% | 25% | 1% | 2.82 | 1.19 |
| 11 | 75% | 25% | 2.5% | 2.88 | 1.33 |
| 12 | 75% | 25% | 5% | 2.75 | 1.44 |
| 13 | 75% | 25% | 10% | 3.13 | 1.44 |
| 14 | 75% | 10% | 20% | 3.23 | 1.50 |
| 15 | 75% | 5% | 20% | 2.63 | 1.60 |
| 16 | 75% | 2.5% | 20% | 2.54 | 1.26 |
| 17 | 75% | 1% | 20% | 2.28 | 1.50 |
| Comp. Ex. D | 75% | 0 | 20% | 2.21 | 1.69 |

As shown in Table 5, filter sheets formed with binder compositions comprising polyacrylic acid and 25 wt. % sorbitol demonstrate an increase in both ambient and hot/humid tensile strength/LOI when a small amount of polyvinyl alcohol is included (1.0 wt. % to 20 wt. %) are included (See, Examples 1-4 and Comparative Example A). Similarly, as shown in Table 6, filter sheets formed with binder compositions comprising polyacrylic acid and 25 wt. % triethanolamine demonstrate an increase in both ambient and hot/humid tensile strength/LOI when a small amount of polyvinyl alcohol is included (1.0 wt. % to 20 wt. %) are included (See, Examples 10-13 and Comp. Ex. C). The results of this testing is illustrated in Example 15.

Figure 16:
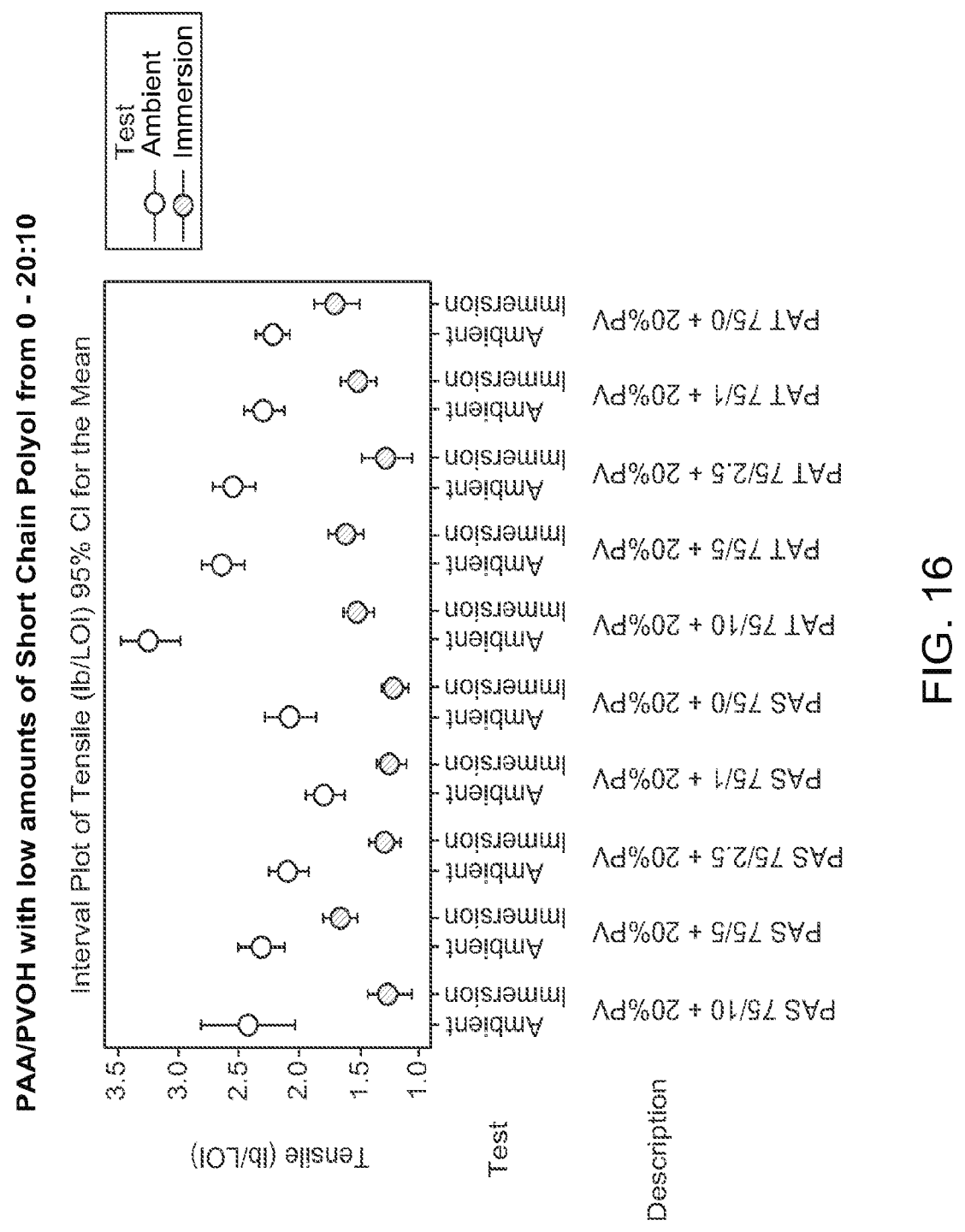

Additionally, filter sheets formed with binder compositions comprising polyacrylic acid and 20 wt. % polyvinyl alcohol demonstrate an increase in ambient tensile strength/LOI when a small amount of either sorbitol or triethanolamine is included (1.0 wt. % to 20 wt. %) are included (See, Examples 5-8 vs. Comp. Ex. B and Examples 14-17 vs. Comp. Ex. D). The filter sheets formed with binder compositions including small amounts of sorbitol further demonstrated increased tensile strength/LOI under hot/humid conditions. The results of this testing is illustrated in FIG. 16. Additionally, the addition of small amounts of triethanolamine to compositions including 20 wt. % PVOH did not significantly impact the tensile strength/LOI under hot/humid conditions. Each of the Examples 14-17 demonstrated improved tensile/LOI compared to sheets formed using binder compositions that excluded PVOH.

Figure 17:
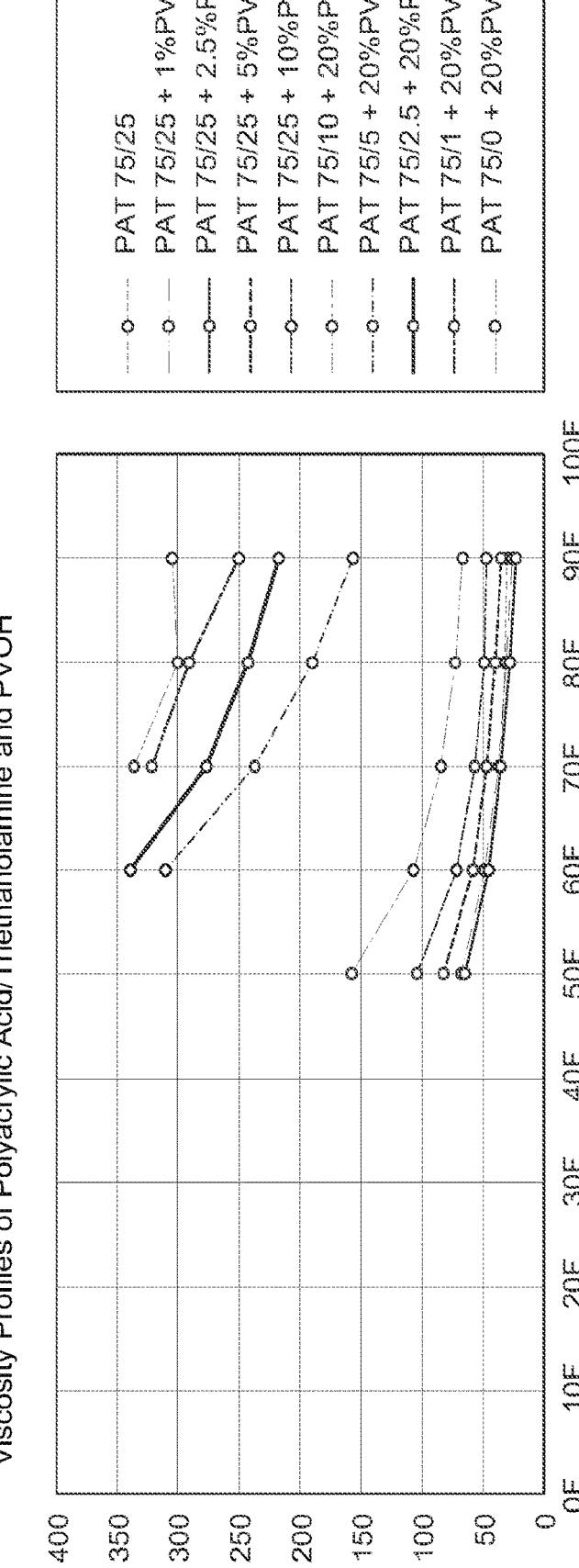
FIG. 17 graphically illustrates viscosity profiles for exemplary binder compositions comprising polyacrylic acid and varying amounts of triethanolamine and polyvinyl alcohol.

Additionally, as illustrated in FIGS. 17 and 18, the addition of small amounts of PVOH surprisingly reduced the binder composition viscosity. FIG. 17 illustrates the viscosity profiles for binder compositions comprising 75 wt. % polyacrylic acid and varying concentrations of triethanolamine and polyvinyl alcohol. As illustrated, compositions including 75 wt. % polyacrylic acid and 25 wt. % triethanolamine demonstrate a viscosity profile of between 160 and 310 cP over a temperature range of 50 F to 90 F. In contrast, the addition of as low as 1.0 or 2.5 wt. % of PVOH lowers the viscosity profile to 30-75 cP over the same temperature range.

It will be appreciated that many more detailed aspects of the illustrated products and processes are in large measure, known in the art, and these aspects have been omitted for purposes of concisely presenting the general inventive concepts. Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

What is claimed is:

1. An aqueous binder composition comprising:
at least 65 wt. % of a polymeric cross-linking agent comprising at least two carboxylic acid groups, based on the total solids content of the aqueous binder composition;
at least one long-chain polyol having at least two hydroxyl groups and a number average molecular weight of at least 2,000 Daltons; and
optionally, at least one short-chain polyol having at least two hydroxyl groups and a number average molecular weight of less than 2,000 Daltons;
wherein a ratio of molar equivalents of carboxylic acid groups, anhydride groups, or salts thereof to molar equivalents of hydroxyl groups is from 1/0.75 to 1/5; and
wherein the binder composition, once cured, includes no greater than 6.0 wt. % water soluble material.

2. The aqueous binder composition of claim 1, wherein the short-chain polyol is present in an amount from 1.0 to 30 wt. %, based on the total solids content of the aqueous binder composition.

3. The aqueous binder composition of claim 1, wherein the short-chain polyol is present in an amount from 10.0 to 25 wt. %, based on the total solids content of the aqueous binder composition.

4. The aqueous binder composition of claim 1, wherein said short-chain polyol comprises one or more of a sugar alcohol, 2,2-bis(methylol)propionic acid, tri(methylol)propane, pentaerythritol, and an alkanolamine.

5. The aqueous binder composition of claim 4, wherein said short-chain polyol comprises a sugar alcohol selected from the group consisting of glycerol, erythritol, arabitol, xylitol, sorbitol, maltitol, mannitol, iditol, isomaltitol, lactitol, cellobitol, palatinitol, maltotritol, syrups thereof, and mixtures thereof.

6. The aqueous binder composition of claim 4, wherein the alkanolamine comprises triethanolamine.

7. The aqueous binder composition of claim 1, wherein a ratio of long-chain polyol to short-chain polyol is between 1/50 and 20/1.

8. The aqueous binder composition of claim 1, wherein a ratio of long-chain polyol to short-chain polyol is between 1/20 and 10/1.

9. The aqueous binder composition of claim 1, wherein once cured, the binder composition includes no greater than 5.0 wt. % water soluble material.

10. The aqueous binder composition of claim 1, wherein once cured, the binder composition includes no greater than 4.0 wt. % water soluble material.

11. The aqueous binder composition of claim 1, wherein the binder composition has a viscosity of 175 cP at 30% solids or less.

12. The aqueous binder composition of claim 1, wherein the binder composition, once cured, has a pH between 5 and 9.0.

13. An aqueous binder composition comprising:
at least one long-chain polyol having at least two hydroxyl groups and a number average molecular weight of at least 2,000 Daltons;
at least 65 wt. % of a polymeric cross-linking agent comprising at least two carboxylic acid groups, based on the total solids content of the aqueous binder composition; and
at least one short-chain polyol having at least two hydroxyl groups and a number average molecular weight of less than 2,000 Daltons,
wherein a ratio of molar equivalents of carboxylic acid groups, anhydride groups, or salts thereof to molar equivalents of hydroxyl groups is from 1/0.75 to 1/5 and a ratio of long-chain polyol to short-chain polyol is between 1/50 and 20/1.

14. The aqueous binder composition of claim 13, wherein the long chain polyol is present in an amount from 1.0 to 30 wt. %, based on the total solids content of the aqueous binder composition.

15. The aqueous binder composition of claim 13, wherein the short-chain polyol is present in an amount from 10.0 to 25 wt. %, based on the total solids content of the aqueous binder composition.

16. The aqueous binder composition of claim 13, wherein said short-chain polyol comprises one or more of a sugar alcohol, 2,2-bis(methylol)propionic acid, tri(methylol)propane, and an alkanolamine.

17. The aqueous binder composition of claim 16, wherein said short-chain polyol comprises a sugar alcohol selected from the group consisting of glycerol, erythritol, arabitol, xylitol, sorbitol, maltitol, mannitol, iditol, isomaltitol, lactitol, cellobitol, palatinitol, maltotritol, syrups thereof, and mixtures thereof.

18. The aqueous binder composition of claim 16, wherein the alkanolamine comprises triethanolamine.

19. The aqueous binder composition of claim 13, wherein a ratio of long-chain polyol to short-chain polyol is between 1/10 and 5/1.

20. The aqueous binder composition of claim 13, wherein a ratio of long-chain polyol to short-chain polyol is between 1/20 and 10/1.

21. The aqueous binder composition of claim 13, wherein once cured, the binder composition includes no greater than 5.0 wt. % water soluble material.

22. The aqueous binder composition of claim 13, wherein once cured, the binder composition includes no greater than 4.0 wt. % water soluble material.

23. A fibrous product comprising:
a plurality of randomly oriented fibers; and
an aqueous binder composition at least partially coating said fibers, said binder composition comprising:

at least 65 wt. % of a polymeric cross-linking agent comprising at least two carboxylic acid groups, based on the total solids content of the aqueous binder composition;

at least one long-chain polyol having at least two hydroxyl groups and a number average molecular weight of at least 2,000 Daltons; and optionally, at least one short-chain polyol having at least two hydroxyl groups and a number average molecular weight of less than 2,000 Daltons;

wherein a ratio of molar equivalents of carboxylic acid groups, anhydride groups, or salts thereof to molar equivalents of hydroxyl groups is from 1/0.75 to 1/5; and wherein the binder composition, once cured, includes no greater than 6.0 wt. % water soluble material.

24. The fibrous product of claim 23, wherein once cured, the binder composition includes no greater than 5.0 wt. % water soluble material.

25. The fibrous product of claim 23, wherein once cured, the binder composition includes no greater than 4.0 wt. % water soluble material.

\* \* \* \* \*